United States Patent [19]
Basehore

[11] Patent Number: 5,802,204
[45] Date of Patent: Sep. 1, 1998

[54] HANDWRITTEN CHARACTER TRANSLATOR USING FUZZY LOGIC

[75] Inventor: Paul M. Basehore, Sanford, Fla.

[73] Assignee: Microchip Technology Incorporated, Chandler, Ariz.

[21] Appl. No.: 481,168

[22] Filed: Jun. 7, 1995

[51] Int. Cl.[6] ............................................. G06K 9/00
[52] U.S. Cl. ..................................... 382/186; 382/224
[58] Field of Search ................................. 382/186, 187, 382/209, 220, 221, 101, 102, 112, 113, 114, 119, 135, 137, 138, 155, 156, 159, 160, 161, 177, 181, 182, 185, 188, 189, 190, 192, 195, 200, 201, 202, 203, 204, 217, 219, 222, 224, 225, 226, 228, 229, 282, 283, 286, 307, 308, 312, 254, 157, 218, 158, 198, 205; 395/3, 13, 20, 50, 61, 76, 77, 900, 101, 22, 27; 364/148, 276.6; 340/146.2

[56] References Cited

U.S. PATENT DOCUMENTS

| | | | |
|---|---|---|---|
| 4,317,109 | 2/1982 | Odaka | 340/146.3 |
| 4,561,105 | 12/1985 | Crane | 382/13 |
| 4,641,355 | 2/1987 | Hongo | 382/34 |
| 5,067,164 | 11/1991 | Denker | 382/15 |
| 5,091,968 | 2/1992 | Higgins | 382/30 |
| 5,237,627 | 8/1993 | Johnson | 382/30 |
| 5,245,695 | 9/1993 | Basehore | 395/3 |
| 5,272,657 | 12/1993 | Basehore | 364/728.03 |
| 5,452,373 | 9/1995 | Shou | 382/209 |
| 5,483,605 | 1/1996 | Rostzmian | 382/181 |
| 5,544,279 | 8/1996 | Li | 395/3 |

Primary Examiner—Leo Boudreau
Assistant Examiner—Bujan Tadayon
Attorney, Agent, or Firm—Lowe, Price, LeBlanc & Becker

[57] ABSTRACT

An arrangement (apparatus and method) for translating pixel images representing characters or symbols into characters using fuzzy logic processing. The disclosed character translator uses two-dimensional membership functions having a center corresponding to a pixel of a feature mask representing a primitive element. A plurality of three-dimensional fuzzifiers output normalized feature mask errors corresponding to a distance error between the pixels of a feature mask and the pixels of the scanned image. The normalized feature mask errors are compared in accordance with a feature mask sequence corresponding to a known character to obtain a normalized character score. The mask sequence having the lowest normalized character score is deemed the most likely candidate as a recognized character of the scanned image. The disclosed character translator may be implemented as a low-cost serial device, or as a high-speed parallel-processing device, which may be multiplexed with other character translation devices using an expansion bus interface.

27 Claims, 16 Drawing Sheets

Figure 2A

| | | | |
|---|---|---|---|
| 0 | ⌐ | 20 | Y |
| 1 | ¬ | 21 | 人 |
| 2 | L | 22 | ⊣ |
| 3 | ⌐ | 23 | ⊢ |
| 4 | \ | 24 | ⁊ |
| 5 | / | 25 | ⊂ |
| 6 | ⌐ | 26 | ⊃ |
| 7 | \ | 27 | ∠ |
| 8 | ∧ | 28 | + |
| 9 | ∨ | 29 | × |
| 10 | > | 30 | ⊬ |
| 11 | < | 31 | ⊣ |
| 12 | ⊥ | 32 | • |
| 13 | ⊤ | 33 | BLANK |
| 14 | ⊢ | | • |
| 15 | ⊣ | | • |
| 16 | ∣ | | • |
| 17 | — | | |
| 18 | / | | |
| 19 | \ | | |

HANDWRITTEN CHARACTER TRANSLATOR USING FUZZY LOGIC

BACKGROUND OF THE INVENTION

1. Field of the Invention

The present invention relates to image recognition devices and pattern recognition devices used to identify varying symbols such as handwritten characters, graphic symbols or mathematical expressions.

2. Description of the Related Art

Handwritten character recognition devices are devices that attempt to identify handwritten images based upon an existing pattern in order to output recognized images. An example of such a handwritten character translator is a personal digital assistant (PDA) device, a hand-held device intended to convert handwritten inputs by a user into text. One inherent difficulty of applications related to handwritten character recognition is that handwritten characters are variable on an individual basis.

In order to accommodate handwritten recognition devices to an individual's handwriting style, typical handwritten recognition devices such as the PDA will operate in software using a trained pattern, whereby a user will place the device in a training mode and enter in the user's alphabet, as well as words and symbols that are used on a regular basis via a graphic user interface, such as a digital writing tablet. The symbols input by the user are then used as a template for use in comparing other letters that are supplied by the user via the graphical user interface. In such a case, however, the operation of the existing handwritten character recognition devices is based on the assumption that an individual's writing style is relatively uniform. Thus, if a user's handwriting varies due to fatigue or stress, the handwritten characters may be unrecognizable. Thus, to ensure recognition, a user may often be required to write slowly and carefully. In addition not only do individuals have different handwriting styles, but an individual's own handwriting may change over time. In addition, the character may be smaller or larger in different instances. Devices attempting to perform handwritten character translation may make incorrect decisions due to an inability to accommodate a variety of handwritten character shapes and sizes. In addition, these devices would be relatively slow due to the software implementation. Finally, the existing handwritten character recognition devices suffer the disadvantage of being user-specific, and would not work for another user because of the individual variations in handwriting.

Another fundamental problem with the above-described handwritten character recognition devices is that their processing is based on digital logic. Such bi-state digital logic requires a value of either "TRUE" or "FALSE", so that approximations are often required of real-world control problems. For example, an input/output relationship y=f(x) would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, if digital logic was used to characterize the function y=f(x), it would be necessary to approximate the function by using discrete values, $y_i = a_i x_i$ ($i = 1, 2, \ldots, n$). Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L. Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

In fuzzy logic, the function f(x) is approximated by a plurality of fuzzy sets which overlap. Rather than approximating a continuous value x by a discrete value $x_i$, fuzzy logic determines for a given value x whether the value x is nearest to the center of a fuzzy set. If an x value is equidistant from two or more fuzzy sets, the resultant y value can be made proportional to the output values suggested by all the fuzzy sets of which the value x is a member.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc. In addition fuzzy logic has been used in one-dimensional pattern comparisons on real-time systems by performing bit-by-bit Hamming distance calculations. For example, commonly-assigned U.S. Pat. No. 5,272,657 to Basehore et al., discloses a fuzzy pattern comparator having an automatic update threshold function that updates error threshold values based upon accumulated comparisons between serial data and pattern data. However, while the fuzzy pattern comparator disclosed in U.S. Pat. No. 5,272,657 is able to determine changes within predetermined patterns generally, it would still be desirable to provide a device able to recognize images such as letters, characters, symbols etc. that may have substantial variations from preexisting patterns.

In addition, commonly-assigned U.S. Pat. No. 5,245,695 to Basehore, discloses a fuzzy microcontroller that provides an efficient implementation for fuzzy logic, the disclosure of which is incorporated in its entirety by reference. Specifically, U.S. Pat. No. 5,245,695 discloses a fuzzifying method for determining the similarity of the crisp input (e.g., the discrete demultiplexed signal undergoing fuzzification) to a fuzzy set. According to the disclosed method of U.S. Pat. No. 5,245,695, the shape of the membership function p is disregarded, and instead the membership value is calculated by determining the distance of the input from a defined center of the membership function $\mu$, and then linearly complementing the crisp input with respect to the width of the membership function $\mu$ so that the resulting similarity signal is a maximum when the distance is a minimum and, conversely, a minimum when the distance is a maximum (e.g., when the crisp input exceeds the width of the membership function $\mu$).

DISCLOSURE OF THE INVENTION

In view of the foregoing, it would be desirable to provide a handwritten character translator that uses fuzzy logic to recognize images such as letters, characters, symbols, etc. despite variations due to size, shape, in the character. Further, it would be desirable to provide a handwritten character translator adapted to recognize different images, regardless of the user writing the image, the writing style of the user, or the language in use.

It is an object of the present invention to provide a low-cost, fuzzy logic-based system that enables analysis and recognition of two-dimensional images that are subject to substantial variation from reference patterns.

It is also an object of the present invention to provide a handwritten character translator system that is able to adjust error thresholds to compensate for variations in a user's handwriting.

It is a further object of the present invention to provide a handwritten character translator system that may be implemented in hardware, and yet provide sufficient flexibility to recognize handwritten images for different users, as well as different languages.

It is a further object of the present invention to provide a handwritten character translator system having a autoprogramming mode in order to establish a group of symbol elements and a group of characters, each character having at least one symbol element sequence used to recognize a handwritten symbol as the corresponding character.

It is a further object of the present invention to provide a handwritten character translator system capable of identifying handwritten characters or symbols regardless of the size or scale of the handwritten character or symbol.

It is a further object of the present invention to provide a handwritten character recognition system that may be expanded to provide parallel processing for more efficient computation.

In order to achieve these and other objects, the present invention provides an arrangement (apparatus and method) using fuzzy logic for identifying handwritten characters and symbols. The disclosed arrangement is designed for maximum flexibility, enabling implementation as a low cost serial device, or as a parallel processing-based system, able to compare an input representing a handwritten character with multiple letters and multiple languages simultaneously.

According to the present invention, a character translator uses fuzzy logic to determine an optimum character candidate from a set of predetermined sets of character sequences. Specifically, the character translator of the present invention uses two-dimensional membership functions in order to compare a plurality of primitives with the character image under analysis. A "primitive" is defined as a basic component of a handwritten character or symbol, for example a dot, a slanted line segment, or a particular collection of line segments, such that a handwritten character or symbol is composed of a sequence of primitives. Thus, the character image is identified based upon a fuzzy logic comparison of the primitives to the handwritten character, so that the sequence of primitives having the lowest accumulated errors with respect to a scanned character image is designated as the optimum character candidate.

The present invention provides an arrangement (apparatus and method) that identifies a scanned character as one of a plurality of previously-recognized characters. According to the present invention, the arrangement includes the steps of: obtaining primitive sequences, also referred to as feature mask sequences, that identify a particular sequence of primitive elements and correspond to one of the recognized characters; providing primitive mask pixel data to a plurality of fuzzifiers in accordance with the sequences, whereby the fuzzifiers correspond to respective primitive mask pixels of at least one of the primitive masks, and the primitive mask pixels are used by the fuzzifiers to define centers of two-dimensional membership functions; providing pixel scan data representing a scanned area including the scanned character to the fuzzifiers in groups corresponding to regions of the scan window, respectively; outputting primitive mask distance errors from each of the fuzzifiers, whereby each of the primitive mask distance errors identify a distance error, also referred to as a recognition error, between the corresponding primitive mask pixel and the corresponding region of the scan window; determining minimal primitive errors for each of the primitive masks of the sequences in accordance with the corresponding primitive distance errors; calculating a character error for each of the recognized characters based on the corresponding sequences and the associated minimal primitive errors of the respective primitive masks; and identifying the scanned character as the one recognized character having the minimal character error relative to the calculated character errors for the other recognized characters.

In a specific implementation of the above-described arrangement, the disclosed handwritten character translator comprises a scan controller, a set of three-dimensional fuzzifiers, a mask sequence comparator, and a feature mask memory. The handwritten character translator is coupled to an external mask sequence memory that stores the primitive sequences defining characters or symbols. According to the present invention, a group of pixels are scanned into the scan control of the handwritten character translator, either by row or by column. The scan control section outputs the pixels of a scan window to the three-dimensional fuzzifiers, which compare the scan window with a feature mask representing a primitive element. The fuzzified outputs are provided to a mask sequence comparator, which compares the relative error of the feature mask with prior feature mask errors in order to determine an optimum character candidate having the lowest accumulated error.

According to the present invention, the lowest accumulated error is based upon the successive comparisons of each feature mask of a mask sequence that is effectively scanned across a scan window. Specifically, a feature mask corresponding to a primitive is compared to pixels of the scan window using a three-dimensional membership function. The three-dimensional membership function is arranged to identify the relative error of the mask sequence to the pixels of the scan window, such that the error is zero when the active pixels of the two-dimensional scan window portion correspond to the center of the membership function. The fuzzified outputs for all pixels representing the error of the feature mask over an entire scan is accumulated and normalized to obtain a normalized feature mask error score. After the handwritten character translator has completed successive scans for each feature mask of the feature mask sequence constituting a character or symbol, the handwritten character translator calculates a normalized character score. The character having the lowest normalized character score is identified as the best candidate for a match; if the candidate is less than a threshold, the character identifier is output, along with the normalized character score. Thus, an external processor may evaluate the normalized character score as well as the character identifier, in order to determine whether the candidate character should be used, or whether an alternative character should be used. The handwritten character translator may also include an expansion bus interface to enable the device to be cascaded with an expansion bus, whereby multiple devices are able to simultaneously compare the relative normalized character score in order to determine an optimum candidate.

The present invention also provides a method for determining an optimum character candidate, comprising the steps of comparing pixels corresponding to a scan window to a plurality of feature masks arranged in a predetermined mask sequence in order to obtain a normalized feature mask error with respect to each feature mask; accumulating each of the normalized feature mask errors for each mask sequence in order to obtain a normalized character score; and comparing the normalized character score for each character candidate in order to determine a character match.

The present invention also provides a method for identifying local minima within a scan sequence. Specifically, a local minimum may be generated during processing, whereby an interim solution is incorrectly determined as the final and complete solution. According to the present invention, the handwritten character translator is able to identify absolute minimum values, and defers processing of local minimum values until the local minima are determined to be global minimum values.

The present invention also provides a method for automatically training the disclosed character translator to prepare a character sequence for predetermined characters in accordance with supplied primitive masks. Thus, the disclosed character translator may be automatically updated with new characters or symbols without extensive reprogramming.

Thus, the present invention provides an advantageous arrangement for the recognition of symbols or patterns using fuzzy logic to determine the minimum recognition errors between sequences of primitives defining corresponding characters or symbols. Thus, while the disclosed arrangement is effective for handwritten character translation, the subject invention is also advantageous for other image recognition applications, such as recognition of text having various fonts or sizes, recognition of mathematical symbols or musical scores, identification of biological or chemical structures such as bacterial or animal cells or cell components, virus structures, DNA structures, crystalline structures, etc.

These and other features of the present invention will become more readily apparent from the detailed description below and the accompanying drawings.

BRIEF DESCRIPTION OF THE DRAWINGS

Reference is made to the attached drawings, wherein elements have the same reference numeral designations represent like elements throughout, and wherein:

FIGS. 2A and 2B are illustrations of feature masks for use in the translation process of the present invention.

BEST MODE FOR CARRYING OUT THE INVENTION

The preferred embodiment of the present invention will now be described with reference to the accompanying drawings.

According to the present invention, character image recognition is based on the fact that character images are essentially made up of a specific sequence of lines, arcs, dots, or a combination thereof. These elements, referred to as "primitives", are the basic building blocks of letters and symbols which, when arranged in a specific sequence, form identifiable letters and symbols. An example of such primitives are shown in FIG. 2A, which are stored in memory in the form of feature masks (described in detail below). Thus, for example, the letter "D" would be composed of the following sequence of primitives shown in FIG. 2A, assuming a top-to-bottom and left-to-right scanning: 0, 2, 4, 6. In addition, although each recognized character has at least one corresponding primitive sequence, a character may have a plurality of primitive sequences, depending on the scale of the letter, or the various handwriting styles that may be present. For example, the letter "V" may have the sequence "9" by itself, or the sequence 19, 18, depending on the size of the letter.

Therefore, the present invention includes a memory that stores a basic set of primitives in the form of feature masks, i.e., an array of pixels that form an image corresponding to the primitives. Each of the feature masks are effectively scanned across a character image to determine if there is a minimal recognition error; if a match is found between a feature mask and a portion of the scanned image, another feature mask is then compared with the same image to determine if the second feature mask also provides a match to the character image. The process is continued in the order specified by each of the feature mask sequences for corresponding characters, until all the sequences of the corresponding characters have been compared to the character image. The feature mask sequence having the lowest normalized error is considered the most likely candidate for recognition; if the normalized error of the candidate is below the predetermined threshold, then the identifier of the candidate is supplied to an external processor, along with the associated normalized error value. Thus, if the character image is determined to be the letter "W", the handwritten character translator of the present invention will preferably output the ASCII value of the letter, as well as the normalized error associated with the corresponding feature mask sequence.

Figure 1A:
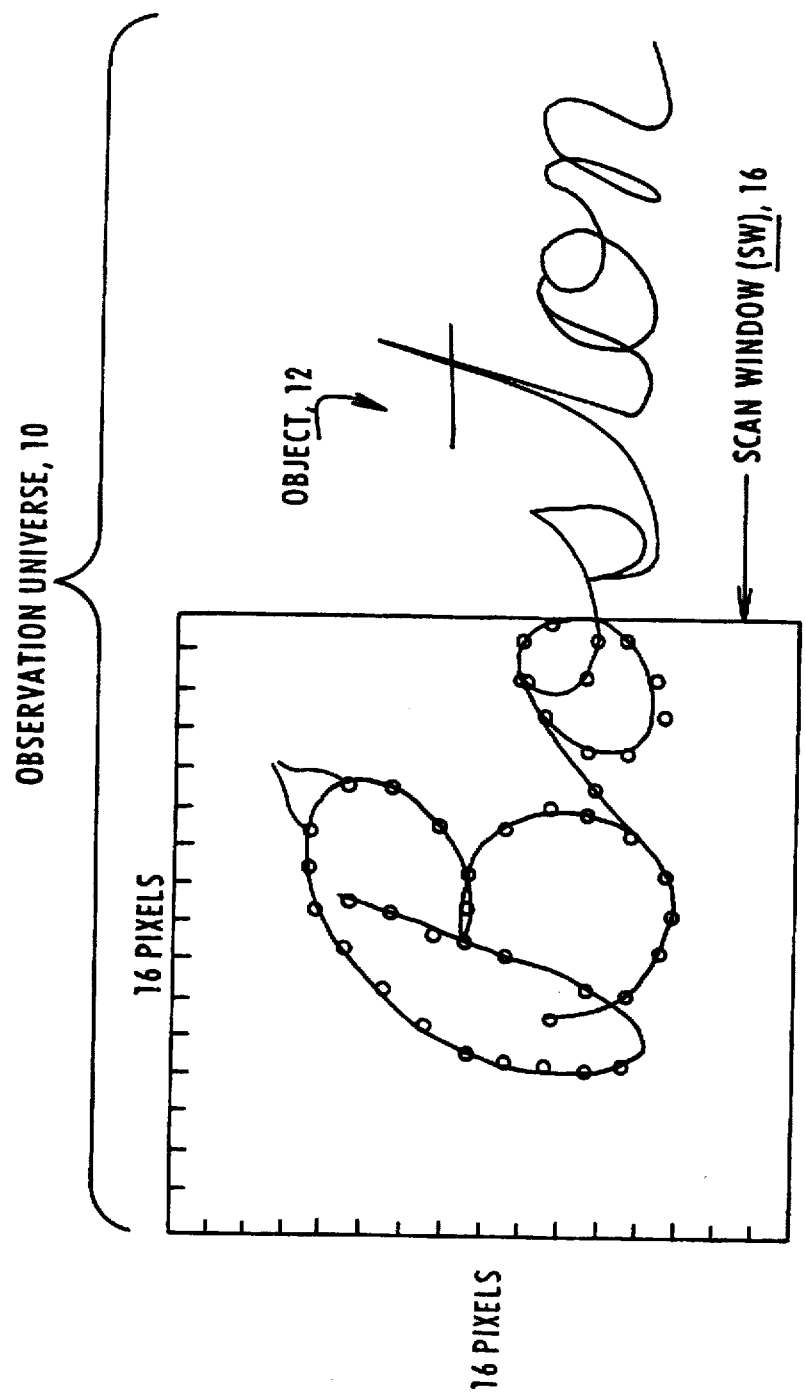
FIGS. 1A, 1B, 1C and 1D are illustrations, respectively, of handwritten characters within a scanning region, a feature mask, linear membership functions and nonlinear membership functions, according to the present invention.

FIG. 1A discloses an illustration of handwritten characters within a scanning region in order to describe the scanned characters. As shown in FIG. 1A, an observation universe 10 corresponds to a scanning region of a typical digital scanner that reads text that is handwritten or printed on a sheet of paper. Alternatively, the observation universe may represent a surface of a digitized tablet whereby images are created by a user using an electronic pen, or any other graphical user interface.

As shown in FIG. 1A, the observation universe 10 stored in a scan memory comprises an object 12. The object 12 is typically a word, such as the disclosed handwritten word "Boston", or may be a graphic image. The object 12 will typically include a plurality of character images, for example, the individual letters of the word "Boston", or elements of a written mathematical formula. Each of the character images are stored in the scan memory as pixels 14 to identify the graphic value of the scanned image.

The present invention is adapted for implementation as a low-cost serial device, or as a high-speed parallel processing device. In the presently preferred embodiment, the handwritten character translator performs sequential processing of individual letters. The scan direction of the preferred embodiment is based upon the reading direction of the particular language. In other words, for English, French, German, and other similar languages, the scanning is performed from left to right to correspond with the reading direction. For Hebrew or Arabic the scan direction would be right to left, and for Japanese or Chinese, the scan direction would be from top to bottom. Thus, as shown in FIG. 1A, a scan window 16 is processed by the handwritten character translator, beginning with the top left-hand corner of the observation universe, 10. Upon completion of processing, the letters "Bo" of the object 12, the scan window 16 will advance to process the remaining letters "ston" of the object 12. Thus, the handwritten character translator begins processing with a scan window 16 disposed in the upper left-hand corner of the stored observation universe 10. According to the preferred embodiment, the scan window (SW) 16 shown in FIG. 1A is a square area of 16 pixels by 16 pixels, although different window sizes may be used, such as 128×128.

Figure 1B:
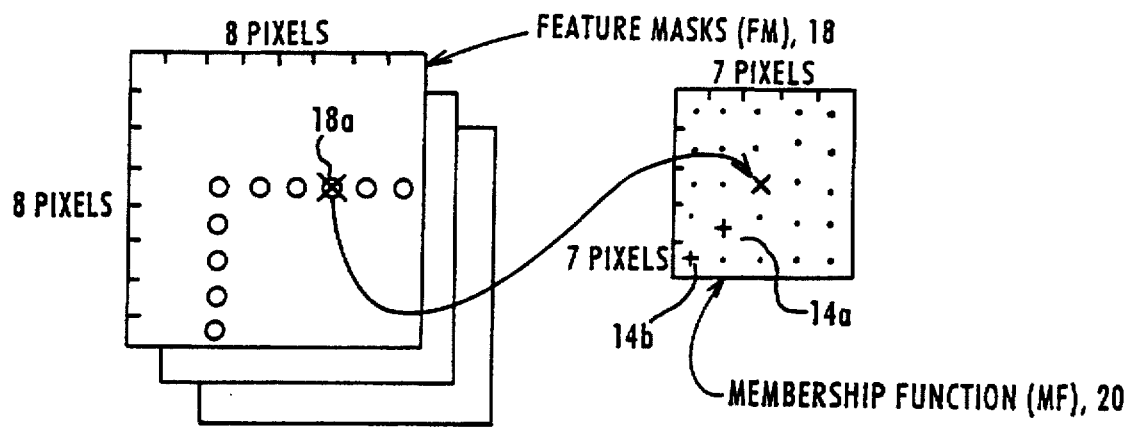

FIG. 1B shows the relationship between feature masks and fuzzy membership functions according to the preferred embodiment of the present invention. As shown in FIG. 1B, a feature mask 18 is represented as an 8×8 pixel array having pixel values that correspond to a corresponding primitive shape from the disclosed primitives shown in FIG. 2A. Thus, the feature mask 18 shown in FIG. 1B has a pixel pattern corresponding to the feature mask 0 shown in FIG. 2A. Each of the pixels of the feature mask 18 are assigned to a corresponding membership function 20 to determine the degree of fuzzy similarity between the corresponding pixel of the feature mask 18 and the associated pixels of the scan window 16. In other words, assuming a scan beginning with the feature mask 18 at the upper left-hand corner of the scan window 16, the pixel 18a of the feature mask 18 would be compared with a 7×7 pixel size portion of the scan window 16 to determine the relative degree of similarity between the corresponding pixel of the feature mask 18 and the currently scanned section of the scan window 16. Therefore, assuming that the pixel 18a of the feature mask 18 had a spatial relationship to pixels 14a and 14b of a scan region, the membership function 20 would assign a similarity value to the corresponding pixels 14a and 14b.

Figure 1C:
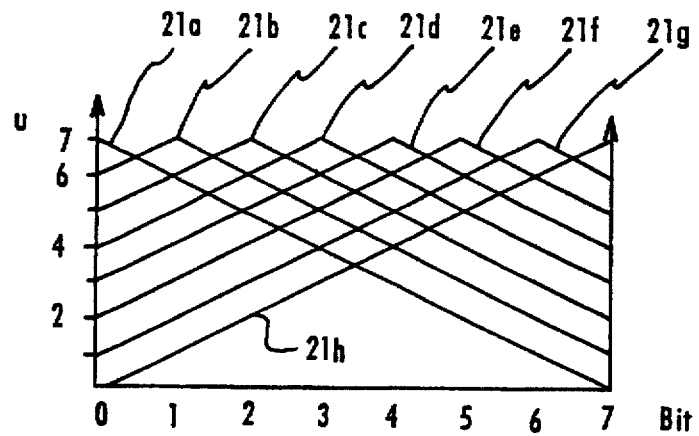

For example, FIG. 1C illustrates a simplified membership function structure of the membership function 20. Membership functions 21a–21h correspond to membership functions of pixels of the feature mask 18 at column locations 0–7, respectively. As shown in FIG. 1C, the membership function 21f corresponds to pixel 18a located at bit location 5 (column 5) in the feature mask 18. The pixels 14a and 14b disclosed in FIG. 1B would be in bit/column positions 4 and 3 relative to pixel 18a, respectively, such that the membership function 21f would assign to pixels 14a and 14b membership function values 6 and 5, respectively, according to the membership functions disclosed in FIG. 1C.

Figure 1D:
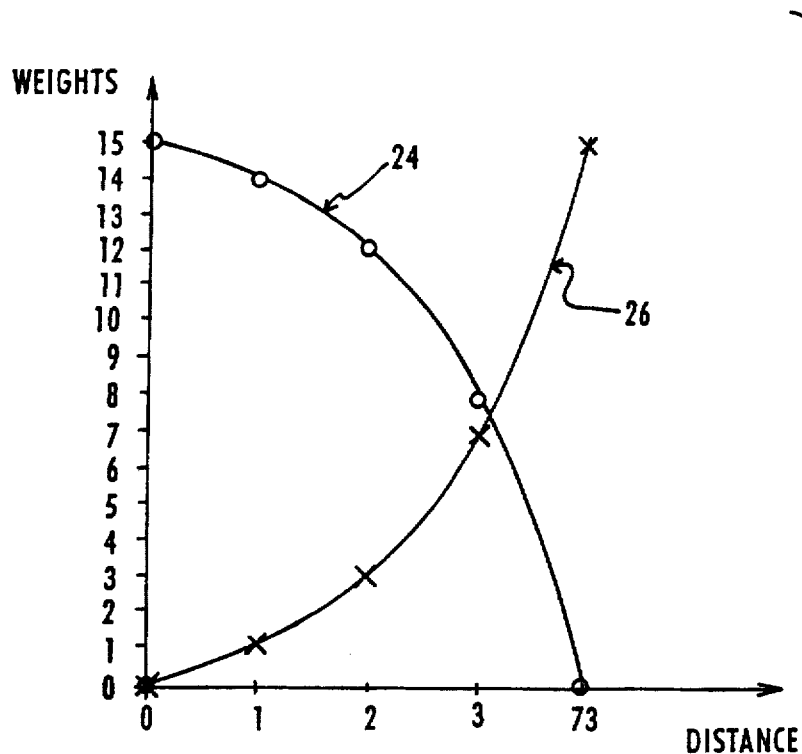
Figure 1D:
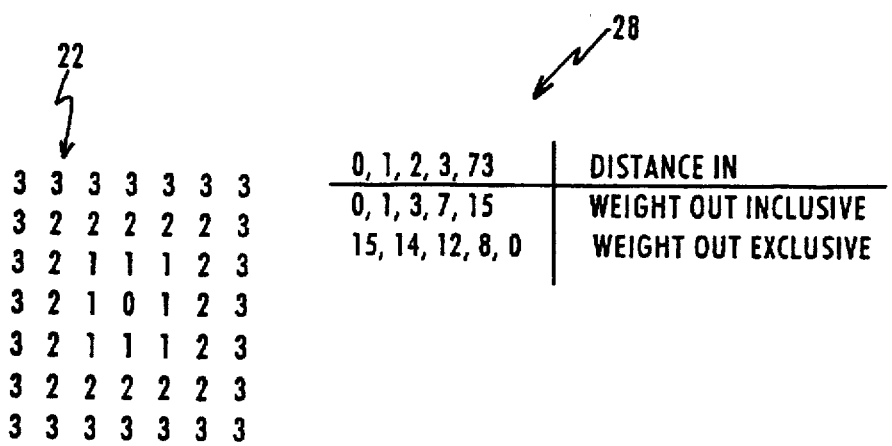

It should be noted, however, that the linear membership functions disclosed in FIG. 1C does not take into consideration that there may be errant pixels that may be at the outer periphery of the membership function. Therefore, in order to improve accuracy, the membership function values according to the preferred embodiment are weighted as shown in FIG. 1D. FIG. 1D discloses a membership function distance map 22, exclusive and inclusive membership functions 24 and 26, respectively, and a truth table 28 corresponding to the membership functions 24 and 26. As shown in FIG. 1D, a pixel corresponding to the center of the membership function has a distance of zero (0) from the membership function center in accordance with the membership function distance map 22. Thus, the weighted membership function value of the pixel for the inclusive membership function 26 is 0. Similarly, as a pixel is farther from the center of the membership function, the distance is greater, and consequently the weighted membership function value increases as shown in FIG. 1D (for inclusive membership functions). For exclusive membership functions 24, as the pixel is farther from the membership function center, the membership function value decreases.

Consequently, the membership functions 24 and 26 provide a recognition error value between the pixel 18a of the feature mask 18, and the pixels 14a and 14b of the scanned object 12. In this instance, the membership function 20 would select the pixel having the lowest error, namely pixel 14, which would have a membership function of value of 1.

FIG. 2A discloses a group of primitives, and as such discloses a proposed memory structure of a feature mask memory storing pixels identifying predetermined primitives. According to the preferred embodiment, the proposed feature mask memory shown in FIG. 2 includes up to 64 addressable feature masks. Each feature mask is an 8×8 array of pixels.

As shown in FIG. 2B, each pixel of the feature mask 18 may be one of three polarities: Inclusive (I), Exclusive (E), or Don't Care (X). If the $2^1$ bit is set to "0", the pixel polarity is a Don't Care; thus, each pixel $FM_i$ is a 2-bit value, whereby pixel values of "2" and "3" result in inclusive and exclusive polarities, respectively. As a result, the feature mask memory stores for each feature mask sixty-four (64) 2-bit pixel polarity words, resulting in a total of 128 bits for each feature mask.

Figure 3:
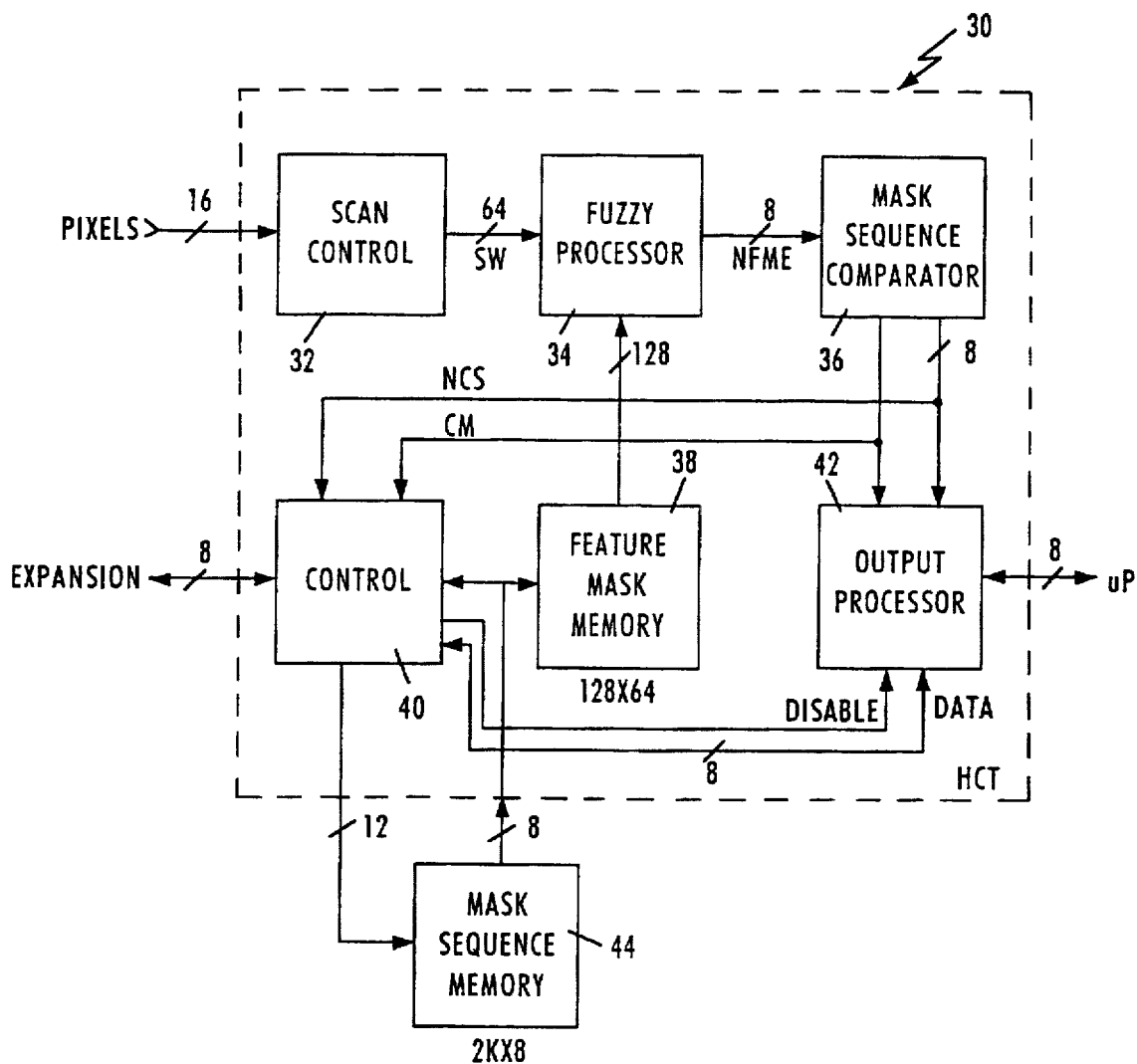
FIG. 3 is a block diagram of the handwritten character translator according to the preferred embodiment of the present invention.

FIG. 3 discloses a block diagram of the handwritten character translator according to the preferred embodiment of the present invention.

As shown in FIG. 3, the preferred embodiment is implemented as a handwritten character translator (HCT) 30, which receives pixel data from an external source, such as an image memory or scan memory storing the scanned pixels of the observation universe 10. For example, the 16-bit signal path PIXELS provide pixel data of the scan window 16 to the HCT 30 on a column-by-column basis, starting with the left-most column of the scan window. The pixels are supplied to the HCT 30 in a scan direction consistent with the reading direction of the language under analysis; thus, for Hebrew or Arabic languages, the pixel data would be supplied on a column-by-column basis starting from the right-most column of the observation universe 10. Similarly, for Japanese characters, the pixel may be provided to the HCT 30 on a row-by-row basis, starting with the top row.

The HCT 30 includes a scan controller 32, a fuzzy processor 34, a mask sequence comparator 36, a feature mask memory 38, a controller 40 including an expansion bus interface (not shown), and an output processor 42. The scan controller 32 receives the parallel stream of pixel data from the PIXELS data stream representing an image from a scanned source, such as handwritten text or typewritten text of various sizes or fonts. The scan controller 32 comprises a plurality of shift registers that store the array of pixel data on a column-by-column basis in order to obtain the 256-bit pixel data of the scan window 16. For example, according to the preferred embodiment, the handwritten character translator 30 receives English text by successively storing the 16-bit column array of pixels; the internal shift registers of the scan controller 32 successively store and shift the 16-bits, so that after sixteen iterations the scan controller 32 stores the two hundred fifty six (256) bits of pixel data for the scan window 16. The scan controller 32 outputs a 64-bit scan window (SW) signal, representing an 8×8 pixel portion of the scan window 16, to the fuzzy processor 34 for fuzzy processing.

Although the scan controller 32 preferably receives the pixel data in a parallel format, as shown, the HCT 30 may also be implemented as a low cost device which receives the input pixel data in a serial format, in which case a flag is set in the control device 40. A more detailed discussion of the flags set in the controller 40 is discussed in detail below.

The fuzzy processor 34 compares the selected section of the scan window 16 with the feature masks stored in the feature mask memory 38 in accordance with the feature mask sequences stored in the mask sequence memory 44. As described above, each character is based upon, or defined by, at least one sequence of primitives as shown in FIG. 2A. This sequence of primitives, referred to as a "primitive sequence" or "feature mask sequence", is used to determine the identity of a symbol under analysis. Thus, the HCT 30 compares a scanned image with the feature masks stored in the feature mask memory 38 in accordance with the sequences specified for each of the characters. The feature mask sequence having the lowest cumulative error with respect to the scanned image is considered as the best candidate for recognition. If the normalized character score of the corresponding sequence is less than a predetermined threshold, the HCT 30 declares a character match, and the character corresponding to the feature mask sequence is deemed the identified letter.

As shown in FIG. 3, the HCT 30 addresses a mask sequence memory 44. As described in detail below with respect to FIG. 8, the mask sequence memory 44 stores the character identification code for the known characters, for example the ASCII codes of the letters of the alphabet and numerals, and the corresponding feature mask sequences. The controller 40 addresses the mask sequence memory for each candidate character in order to obtain the feature mask sequence. The mask sequence memory 44 in response outputs the addressed data, which includes the address of the specific feature mask. The feature mask address is supplied to the 128×64 feature mask memory 38, which outputs the 128-bit pixel data for the corresponding feature mask 18 shown in FIG. 1B to the fuzzy processor 34.

According to the disclosed embodiment, the fuzzy processor 34 comprises sixty-four (64) three-dimensional fuzzifiers that perform fuzzy calculations according to the membership functions 24 and 26 shown in FIG. 1D. The membership values, which represent respective recognition errors or distance errors, are accumulated and normalized in order to obtain a normalized feature mask error score (NFME) for the corresponding feature mask 18. A more detailed description of the fuzzy processor 34 is discussed below with respect to FIG. 4.

The mask sequence comparator 36 receives the 8-bit NFME signal from the fuzzy processor 34 for the corresponding feature mask 18. The mask sequence comparator 36 compares the NFME of the feature mask 18 with other calculated NFME's of the same feature mask compared with different portions of the scan window 16 in order to effectively determine a local minimum. As discussed in detail below with respect to FIG. 7, the same feature mask 18 is effectively scanned across the scan window 16 in order to determine the minimum error of the feature mask 18 at different positions relative to the scan window 16. Thus, the mask sequence comparator 36 calculates the optimum location of the corresponding primitive on the scan window 16 based upon the minimum NFME value for the particular feature mask. The mask sequence comparator 36 then accumulates the NFME values for corresponding feature masks of a particular mask sequence. The accumulated feature mask errors are normalized by the mask sequence comparator 36 for the mask sequence to obtain a normalized character score (NCS), representing the recognition error of the character corresponding to the feature mask sequence. If the normalized character score is less than a predetermined threshold, the match sequence comparator 36 outputs a character match (CM) flag and the normalized character score (NCS), indicating that a match has occurred. A more detailed description of the mask sequence comparator 36 is found below with respect to FIG. 6.

The output processor 42 receives the CM flag and the 8-bit NCS value from the mask sequence comparator 36. The output processor 42 has a microprocessor data bus interface to provide the 8-bit NCS value to a host processor. In addition, the output processor also receives a control signal (DISABLE) that prevents any output by the output processor 42 in the event that the HCT 30 is combined with a plurality of units on an expansion bus interface, whereby another HCT unit provides a winning match.

According to the preferred embodiment, the output processor 42 operates in one of two modes, an interrogate mode, and a run mode. During the interrogate mode, the output processor stores all the received NCS values for each of the feature mask sequences of the corresponding characters. Thus, during the interrogate mode, the host microprocessor is capable of reading back the membership score for all the characters. During the interrogate mode, the character ASCII value (supplied by the control 40 via the 8-bit data line) and the corresponding NCS is passed to the host microprocessor, regardless of whether or not the corresponding NCS value is less than the predetermined threshold. Thus, the host microprocessor is able to receive all character scores for the corresponding characters. The output processor 42 also operates in the run mode, whereby the last four winning character below the threshold are output to the microprocessor, as well as their respective scores. The run mode is thus faster than the interrogate mode, and requires less host microprocessor activity. The output modes of the output processor 42 could be further modified to include more character candidates or less character candidates, as desired, along with their corresponding NCS character score values, if desired.

The control unit 40 is responsible for the overall processing functions of the HCT 30. The control unit 40 addresses the mask sequence memory 44 to obtain the appropriate mask sequence data. In addition, the control 40 receives the character match (CM) flag and the NCS values from the mask sequence comparator 36 for use on an expansion bus interface, if desired. If an expansion bus interface is used, the controller 40 provides control outputs to the output processor 42, as well as any desired data, in accordance with the data received on the expansion bus interface identifying whether another HCT device has a lower NCS score. Finally, the control unit 40 provides all necessary timing, reset, and other overhead functions for the other components of the HCT 30.

Although not shown in FIG. 3, the control unit 40 includes internal control registers and data registers to manage the character recognition processing of the HCT 30. For example, the control register is an 8-bit register which has 1-bit flags to identify the following features: character size, mode, input format, select, reset, interrupt request, and Done/Continue. The character size bit identifies whether the character code stored in the mask sequence memory 44 is an 8-bit or 16-bit value. The mode bit identifies whether the output processor 42 is operating in the interrogate mode or the run mode. The input format bit identifies whether the scan control 32 is receiving data in parallel or serial format. The select bit configures a data register internal to the control unit 40 to identify whether the data register contains a data field or an address field. The reset bit identifies whether the HCT 30 is in a normal state or a reset state. The interrupt enable bit identifies whether the control unit 40 is to generate an interrupt when the HCT 30 has completed the recognition process. The Done/Continue bit identifies whether a read or write function is completed, or whether the operation should be continued.

Similarly, the control unit 40 includes a data register, whereby the select bit A of the control register selects this register as either an address or data register. The data register preferably stores eight addressable bytes of data. The first byte of data provides character and NCS score information. The second byte of information stores the feature mask threshold used in the fuzzy processor 34 to determine whether the feature mask reaches a particular threshold level. The third byte stores the mask sequence threshold used by the mask sequence comparator 36. The fourth byte of information stores the data retrieve from the mask sequence memory 44. The fifth byte of information stores the addressed feature mask memory data. The remaining bytes of the register are reserved.

The control unit 40 also comprises the following registers for use during the translation process, described in detail below with respect to FIGS. 9A and 9B: a mask sequence endcount register (ENDMS), a feature mask endcount register (ENDFM), a mask sequence memory address counter (MSADRS), an endcount register (ENDCNT), an NFME threshold register (L), a mask sequence threshold register (MS), and row and column registers (R, R', C, C').

As will be appreciated by those in the art, data which contains more than one byte is accessed through sequential read or write operations. Whenever the select (SEL) bit is changed in the control status register, or whenever the reset bit is set, the internal address counter is reset to address 0. Each read or write will increment the address counter. In addition, it will be appreciated that if the select bit is changed to identify that addresses are stored, the above registers may index memory locations storing the above-described data.

As shown in FIG. 3, the mask sequence memory 44 is implemented as an external device addressable by the HCT 30. As a result, the HCT 30 maintains maximum flexibility and is readily adaptable for use with different languages and symbols, merely by replacing the mask sequence memory with another mask sequence memory programmed for a different character set. Thus, the mask sequence memory 44 is preferably a plug-in ROM, or an EEPROM. Alternatively, the mask sequence memory 44 may be replaced with a virtual memory device, such as a disc drive having sectors formatted for virtual memory functions. Such variations may be desirable during design, training, or troubleshooting.

Figure 4:
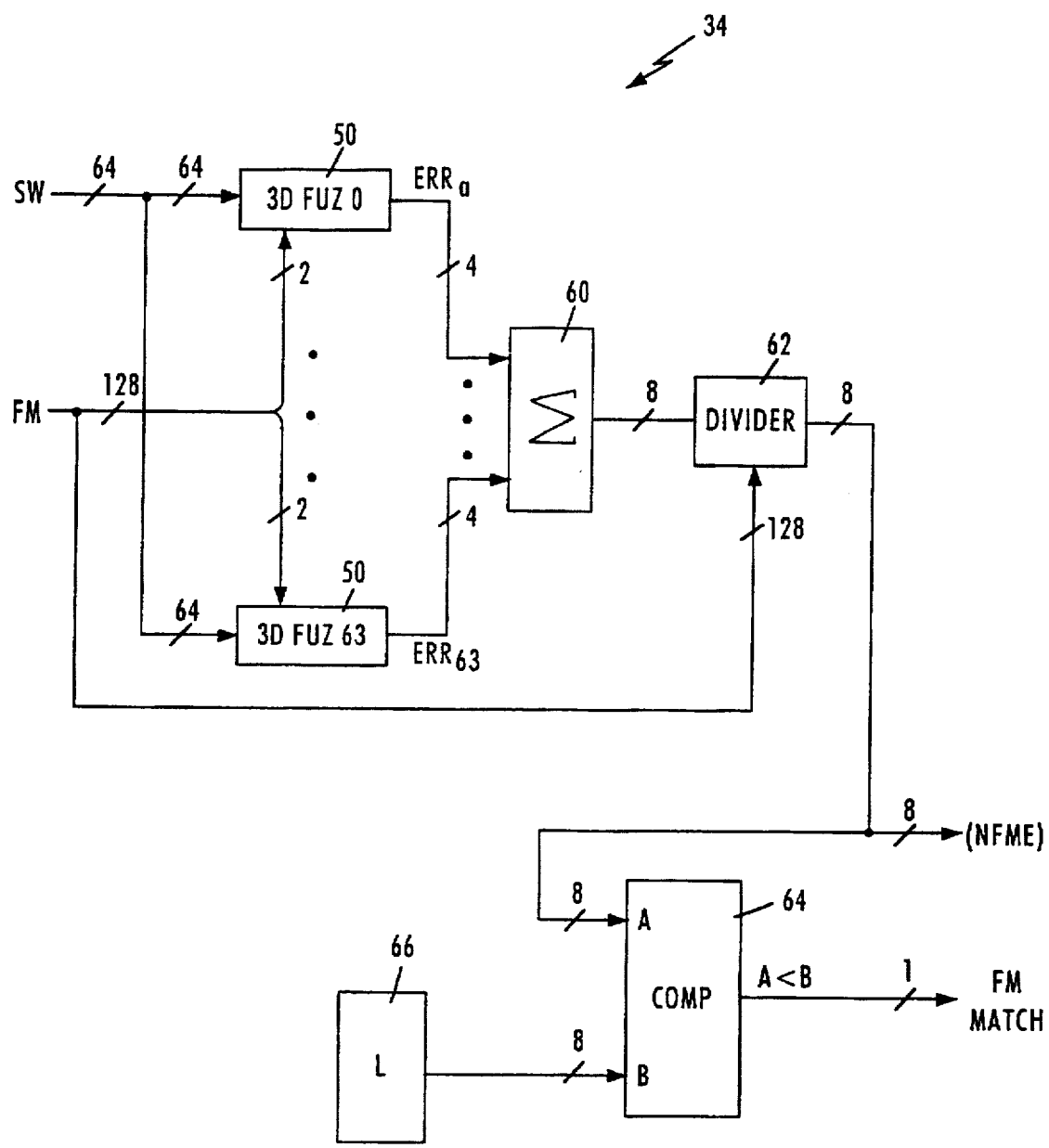
FIG. 4 is a block diagram of the parallel fuzzy processor shown in FIG. 3.

FIG. 4 discloses a block diagram of the fuzzy processor 34 shown in FIG. 3 according to the preferred embodiment of the present invention. As shown in FIG. 4, the fuzzy processor 34 comprises at least sixty-four (64) fuzzifiers 50. Each of the fuzzifiers 50 receive a corresponding 2-bit pixel polarity word of the feature mask from the feature mask memory 38, and a 7×7 pixel portion of the 64-bit scan window (SW) pixel data from the scan control 32. In other words, each fuzzifier 50 performs membership function processing for one of the pixels of the feature mask 18 shown in FIG. 1B. Each of the fuzzifiers thus implement a two-dimensional membership function having an arrangement as a 7 pixel by 7 pixel membership function as illustrated as membership function 20 in FIG. 1B. Each of the fuzzifiers 50 perform the fuzzy calculations by determining a weighted distance of an input scan pixel to the corresponding feature mask pixel serving as the center of the membership function. Specifically, as shown in FIG. 1D, each of the fuzzifiers 50 determine the distance of a scanned pixel according to the membership function map 22. The distance values for the corresponding pixel are multiplied by the weight factors 24 and 26 for inclusive and exclusive membership functions, respectively. Thus, the distance values are translated to the weighted distance values (ERR) according to the truth table 28, shown in FIG. 1D. By weighting the distance values, the fuzzifiers 50 reduce the chance of errors due to stray or erroneous marks in the pixel map, so that the degree of membership is greatly reduced as a pixel deviates further from the center of the membership function.

Figure 5:
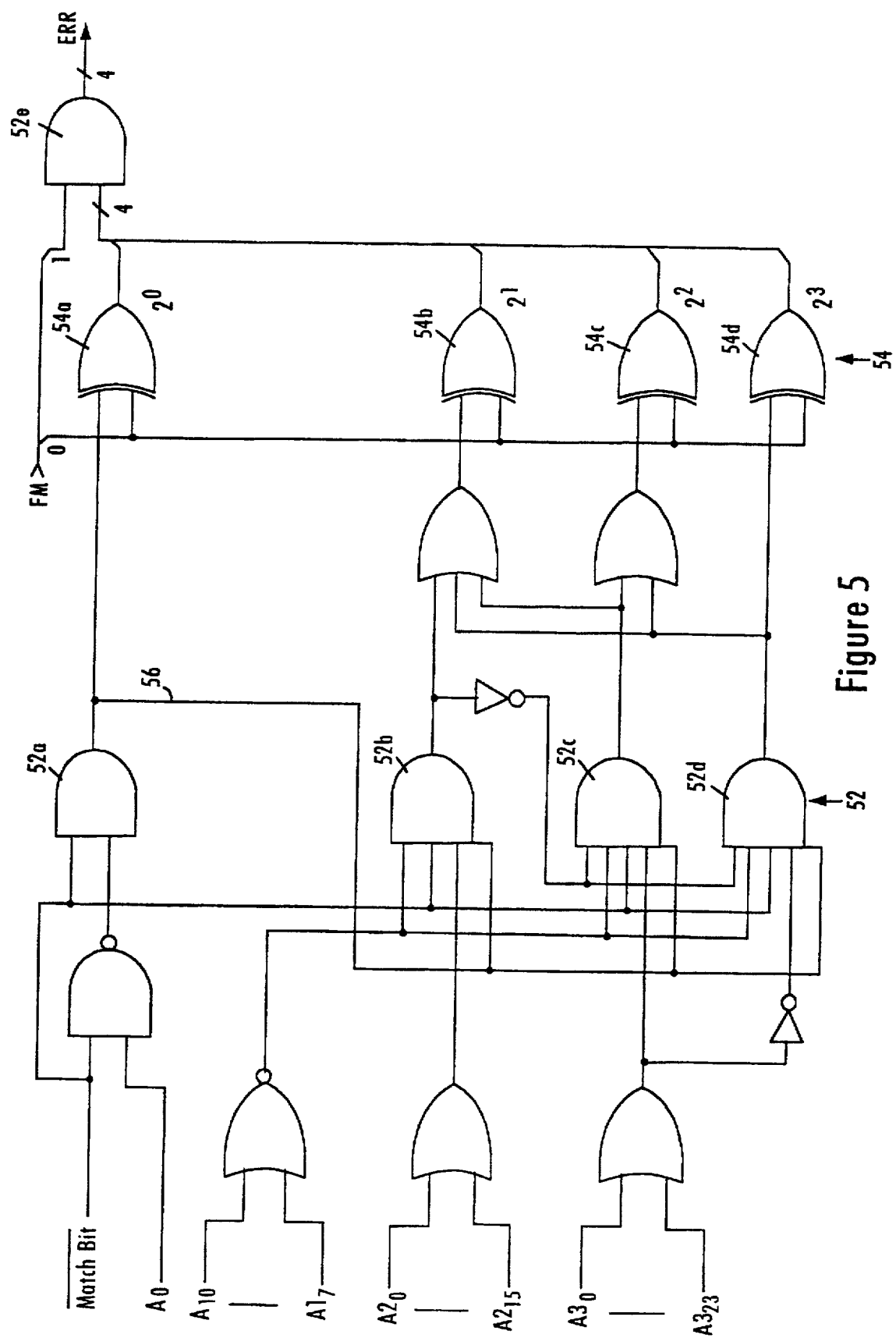
FIG. 5 is an exemplary circuit diagram of the three-dimensional fuzzifier shown in FIG. 4.

FIG. 5 discloses a circuit diagram of the fuzzifier 50 according to the preferred embodiment. As shown in FIG. 5, the fuzzifier 50 comprises a plurality of logic gates (AND, OR, NAND, NOR, XOR) that are used to output weighted distance signals generated in accordance with the truth table 28 shown in FIG. 1D. Specifically, the fuzzifier 50 shown in FIG. 5 receives the pixel information for a 7 pixel by 7 pixel portion of the scan window 16, as well as a match bit having reverse logic. The match bit is used to disable the fuzzifier if a previous feature mask is identified as a match; in such a case the match bit is reset from "1" (enable) to "0" (disable).

The inputs $A_{x,y}$ are the pixel values supplied by the scan control 32 corresponding to the 7×7 pixel scan window portion. In other words, the input A0 corresponds to the pixel associated with the "0" location of the membership function map 22; the inputs $A1_0$ to $A1_7$ correspond to the eight (8) pixel inputs associated with the range of pixel inputs having a distance of "1" as shown in the membership function map 22; the inputs $A2_0$ to $A2_{15}$ correspond to the sixteen (16) pixel inputs having a relative distance of "2" as shown in the membership function map 22; and the inputs $A3_0$ to $A3_{23}$ correspond to the twenty-four (24) pixel inputs having a distance value of "3" as shown in the membership function map 22. Thus, the pixel inputs of the portion of the scan window 16 processed by the corresponding fuzzifier 50 are arranged based on the relative distance of the pixels to the center of the membership function. As a result, each of the fuzzifiers 50 can be hard-wired as dedicated fuzzifiers for a specific pixel of a feature mask. The least significant bit of the feature mask pixel word (FM) is supplied to an array of exclusive-OR gates 24, that toggle the output bits based upon whether the feature mask pixel under consideration corresponds to an inclusive membership function 24 or an exclusive membership function 26.

The 2's bit of the pixel polarity word enables the output of an AND gate 52e, so that if a feature mask pixel is a "Don't Care", there is no output by the fuzzifier 50. Thus, if the feature mask pixel corresponds to an inclusive membership function 24, the pixel polarity word FM is "2" (FM=2); if, however, the corresponding pixel of the feature mask is an exclusive membership function 26, the pixel polarity word is "3" (FM=3).

Operation of the fuzzifier 50 will now be described. As shown in FIG. 1B and FIG. 1D, a pixel 18a of the feature mask 18 corresponds to a center of a membership function 20. If the scan window 16 includes pixels 14a and 14b that are within the vicinity of the feature mask pixel 18a, the membership function 20 will output a weighted error value corresponding to the distance of the pixels 14 to the center of the feature mask pixel 18a. If the scanned pixels 14 are closer to the center of the membership function, there is a higher possibility that the feature mask under consideration is a match; conversely, if a pixel 14b is farther away from the center of the membership function, there is a greater error indicating a lesser possibility that the pixel 18a should be considered as corresponding to the pixel 14b (i.e., no match). As described in detail below, the subsequent accumulations of errors provides optimum candidates for recognition based on those having the lowest normalized recognition error.

As shown in FIG. 5, the fuzzifier 50 receives the input pixel data corresponding to the membership function map 22 shown in FIG. 1D. If there has not been a previous match identified, such that the match bit is not cleared (Match Bit=1), the AND gate 52a outputs a zero (0) if the pixel A0 is active (A0=1). If the pixel A0 is active, the fuzzifier 50 concludes that the weighted error is 0 (inclusive), and the AND gate 52a outputs a "0" to an exclusive OR (XDR) gave 5a and the remaining AND gates 52b, 52c and 52d via the signal path 56, so that the output of the fuzzifier 50 is "0" for inclusive polarity (FM=0), or "15" for exclusive polarity (FM=1). If the A0 pixel is not active, the output of AND gate 52a is a "1", and the AND gate 52b determines if there is any active A1 pixels. If there are any active A1 pixels, the AND gates 52b, 52c and 52d each output zeros to respective XDR gates 54b, 54c, and 54d, resulting in the fuzzifier output of "1" (inclusive), or "14" (exclusive). Similarly, if any of the A2 pixels are active, the AND gates 52b, 52c and 52d output a "1", "0", and "0", respectively, resulting in a fuzzifier output of "3" (inclusive) or "12" (exclusive). If any of the A3 pixels are active (with A0, A1 and A2 pixels being 0), the outputs of AND gates 52b, 52c and 52d are 0, 1, 0, respectively, resulting in an output of "7" (inclusive) and "8" (exclusive). Finally, if all the pixels A0, A1, A2 and A3 supplied to the fuzzifier 50 are inactive having a value of "0", the output of the fuzzifier 50 is "15" (inclusive) and "0" (exclusive). Therefore, the fuzzifier 50 provides a simple implementation for a three-dimensional fuzzifier, whereby a two-dimensional array of scanned pixels is compared to a specific pixel of a feature mask 18 to output a weighted error value (ERR).

As shown in FIG. 4, each fuzzifier 50 outputs a 4-bit weighted error value (ERR). Each of the weighted error values are supplied to a summation circuit 60, which performs parallel addition to obtain the accumulated error values from the fuzzifiers 50. According to the preferred embodiment, the summation circuit 60 comprises a cascaded arrangement of thirty-two (32) 4-bit adders, sixteen (16) 5-bit adders, eight (8) 6-bit adders, four (4) 7-bit adders, two (2) 8-bit adders and one (1) 8-bit plus carry adder. The resulting 9-bit accumulated weighted error value is normalized by a divider circuit 62, which divides the 9-bit accumulated weighted error value by a 5-bit number representing the number of active pixels in the feature mask, whereby the number of active pixels includes inclusive and exclusive pixels. The divider circuit 62 outputs the resulting value as a normalized feature mask error score (NFME).

The normalized feature mask error score represents the normalized error of the feature mask at the specific scan location of the feature mask relative to the scan window 16. Thus, if the scan were to begin at the upper left-hand corner of the scan window 16, the normalized feature mask error score (NFME) would represent the normalized error for the specific feature mask if it were overlaid over the 8×8 pixel portion of the scan window 16. As explained in detail below, the NFME for the corresponding feature mask at a specific location of the scan window 16 is compared with other NFME values of the same feature mask at different locations of the scan window 16 in order to determine a minimum NFME value for the feature mask. The minimum NFME value of the feature mask corresponds to the ideal relative position of the feature mask to the scan window 16 for recognition purposes.

As shown in FIG. 4, the fuzzy processor 34 also includes a comparator 64 that compares the calculated NFME with a predetermined feature mask threshold stored in a memory 66, such as a register in the controller 40 of FIG. 3. The feature mask threshold "L" stored in memory 66 represents the worst case error that would be acceptable for comparison purposes. As discussed below, the feature mask threshold may be adjusted to compensate for variations in handwriting styles, pixel errors associated with scan quality, etc. If the NFME is less than the threshold L, the comparator outputs an FM match flag, which may be used as an enable signal for an output latch in the parallel fuzzy processor 34 (not shown), or as a feature mask indicator flag for the control processor 40 or the host processor.

Figure 6:
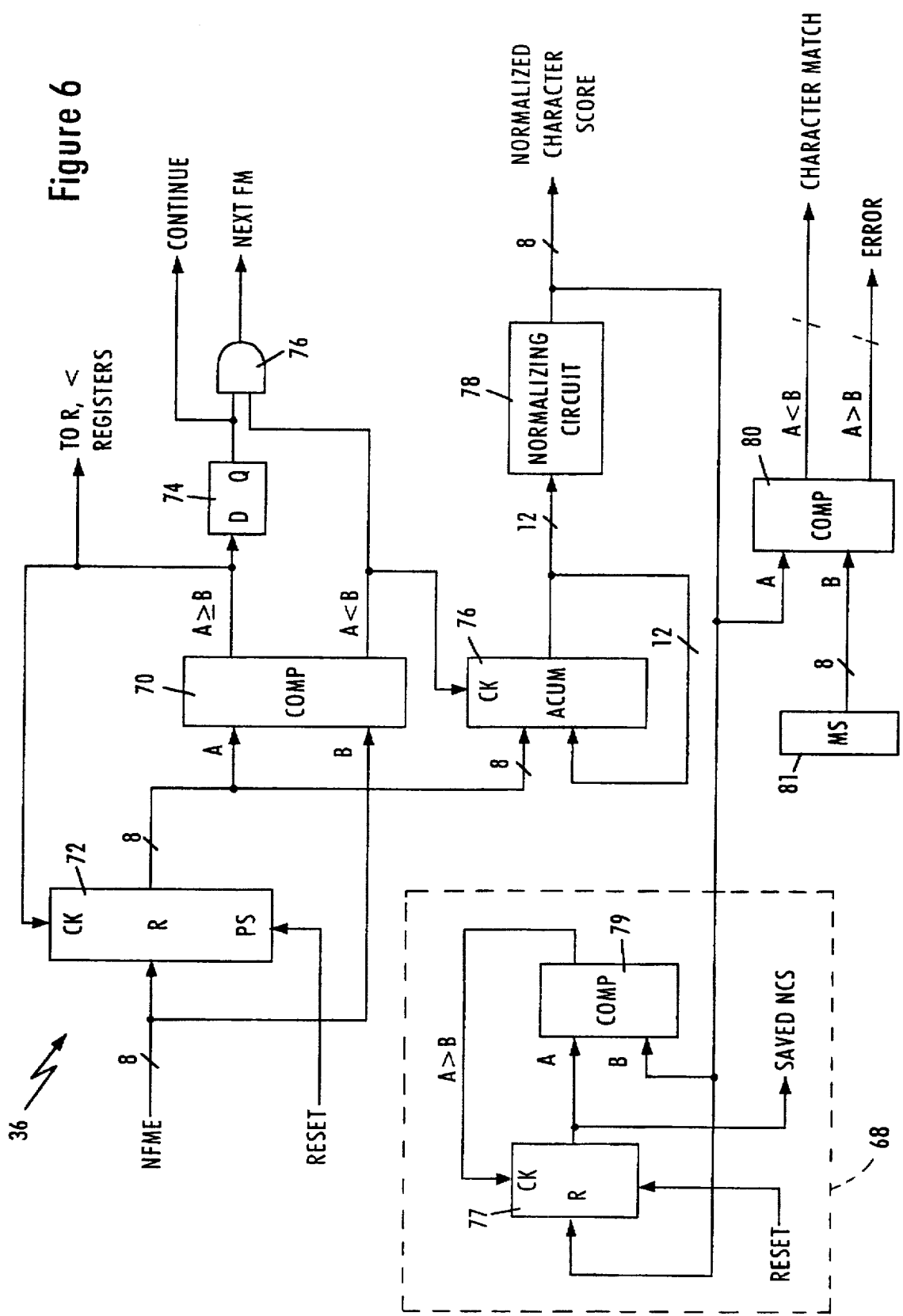
FIG. 6 is a block diagram of the mask sequence comparator shown in FIG. 3.

FIG. 6 discloses an exemplary block diagram of the mask sequence comparator 36 shown in FIG. 3. As shown in FIG. 6, the 8-bit NFME signal for the corresponding feature mask comparison with the 8×8 pixel scan window portion is supplied to a comparator 70 and a register (R) 72. The register (R) 72 stores the minimum NFME calculated for the corresponding feature mask. In other words, the comparator 70 outputs a negative edge-trigger clock signal to the register (R) 72 and external Row, Column registers (described in detail below), that causes the register (R) 72 and the R, C registers to store minimum NFME values output by the fuzzy processor 34 by successive scans of the scan window portion, based on the logic that as a feature mask is successively scanned across a scan window, the minimum NFME value will be reduced until it reaches a minimum. When the minimum is reached, the output of the delay flip-flop 74 and the A>B output of the comparator 70 will simultaneously be set at 1, indicating the minimum of the feature mask. At that time, the AND gate 76 outputs a signal for the control processor to begin processing the next feature mask. Alternatively, if it is desired that the minimum comparison is continued throughout the entire scan, the AND gate 76 may be deleted.

Each time the comparator 70 determines a minimum NFME for a particular feature mask, the NFME value stored in the register 72 is added to an existing accumulated NFME value in an accumulator 76. The accumulator 76 accumulates the NFME values for a mask sequence until a reset signal is received from the control 40. The accumulated value is output from the accumulator 76 as a 12-bit value to a normalizing circuit 78, which divides the 12-bit accumulated value with the number of feature masks in the mask sequence to obtain a normalized character score (NCS) for the mask sequence corresponding to selected character. In addition, the normalized character score for the corresponding character is supplied to a comparator 80 which compares the normalized character score with the mask sequence threshold (MS) stored in the internal registers 81 of the control circuit 40 shown in FIG. 3. If the comparator 80 determines that the NCS is less than the mask sequence threshold (MS) stored in the register memory 81, the comparator 80 outputs a character match flag (CM), indicating that the character corresponding to the mask sequence is a candidate for recognition.

As suggested above, the character corresponding to the mask sequence having a normal character score less than the mask sequence threshold is considered a candidate, and not necessarily the actual character. Rather, it is preferred that the character candidate be supplied to a post processor that receives the character candidates, and performs context-based processing to determine the probability of success for the character candidate. For example, the post processor may be implemented as a word processor, a spell checker, or a thesaurus or a grammar checker, that uses additional processing to overcome limitations due to extreme variations in character recognition. For example, in certain instances, there is a logical difficulty to determine if certain characters are upper case or lower case, for example, the letter "O", whether it should be an upper case letter, a lower case letter, or the numeral zero. A word processor-based system would be able to determine whether upper case or lower case was necessary based upon an evaluation of adjacent letters, or whether the letter was at the beginning of a word at the beginning of the sentence. In addition, some characters have very few features that may be used for discrimination against other characters. For example, a simple vertical line may be either a lower case letter I ("i") or letter L ("l"), or possibly even the numeral one ("1"). Finally, for extreme handwriting, limitations may also exist, as evidence by the difficulty of individuals to recognize other people's handwriting. Thus, if the handwritten character translator is unable to provide any character candidates, the handwritten character translator will typically output an error signal to the host processor.

The mask sequence comparator 36 may also include a character sequence comparator 68, comprising an R-flip flop 77 and a comparator 79. The character sequence 68 stores the minimal NCS calculated for an image (SAVED NCS). Alternately, this function may be performed in the controller 40.

Figure 7:
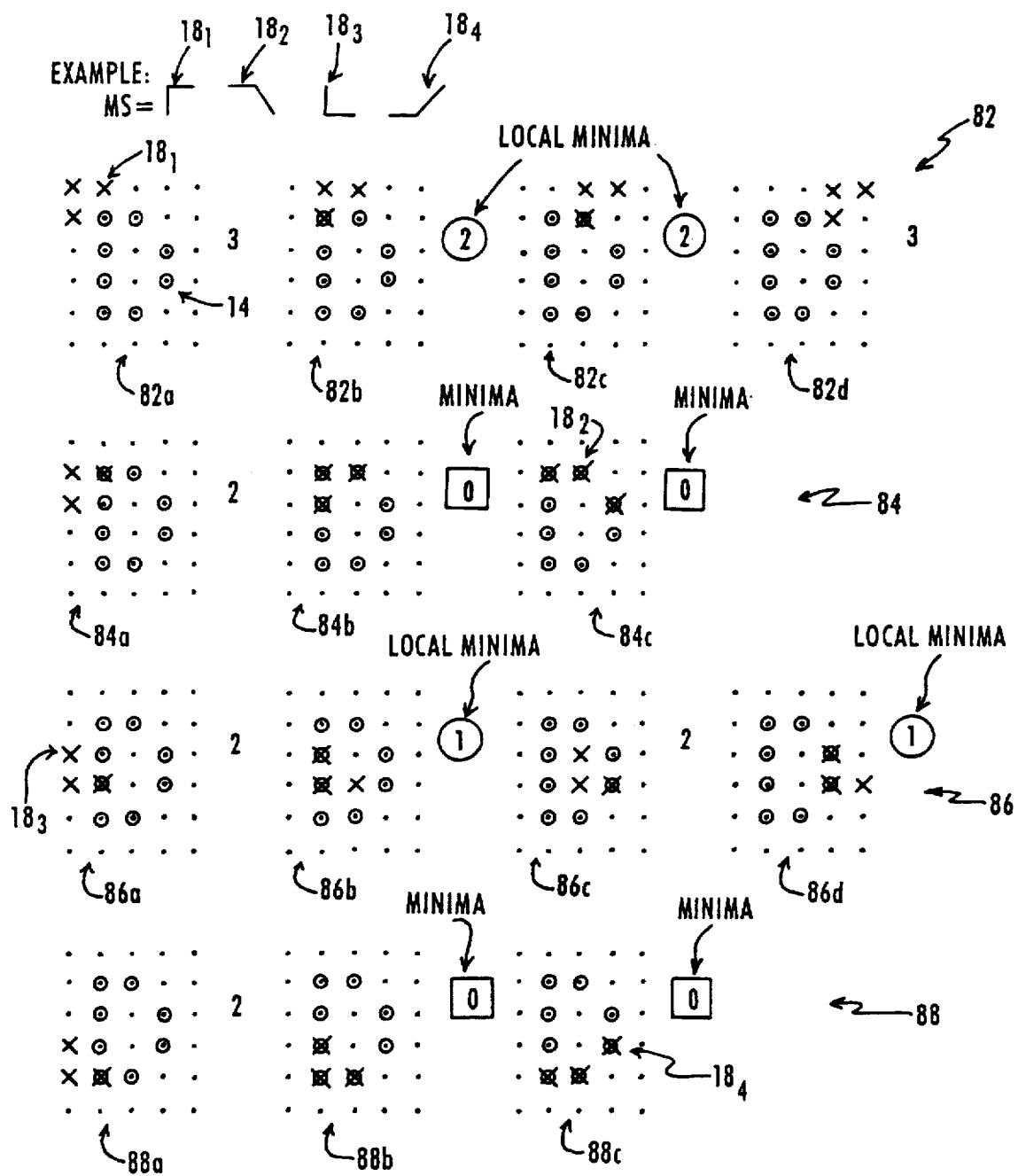
FIG. 7 is an illustration of local minima calculations that may occur during processing.

FIG. 7 illustrates a series of comparisons between a group of feature masks of a mask sequence for the letter "D", and a scanned letter "D". Specifically, FIG. 7 illustrates a problem of a local minimum that may occur if the scanning process is terminated prematurely. Although the illustration of FIG. 7 discloses a scanning sequence performed in the left-to-right direction, the discussion with respect to local minima is equally applicable toward a scanning sequence beginning top-to-bottom. As shown in FIG. 7, the feature mask $18_1$ is successively compared with the portion of the scan window in order to identify the character image represented by the image pixels 14. In the scan comparison 82a, the error of the feature mask $18_1$, is assigned a value of three (3) (not normalized), which for simplification purposes is characterized as the summation of the distances of the pixels of the feature mask 18 from the pixels of the scanned image 14. During the next scan comparison 82b, the unnormalized error is a value of two (2). During the scan 82c, the error is also two (2), and during the scan 82d, the error is three (3). Thus, for the scanning across the row as shown by the sequence 82, the error analysis provides a local minima value of two (2) for the scans 82b and 82c.

Local minima occur when the NFME is greater than 0 and less than the feature mask threshold and then becomes larger, within the above-identified range (and then smaller again). Analogous to the problems of local minima that may occur in neural networks, there is a risk that the local minima will not provide the best result. Consequently, whenever a local minima is found, the address of the minima (e.g., the row and column of the corresponding scan) should be saved. Thus, additional processing can determine if there is a lower error value to replace the local minimum. If the stored local minimum is ultimately determined at the end of the scan of the entire scan window to be the true minimum, the address (row/column) can be retrieved and used as the starting place for the next feature mask. If an error value (NFME) is found to equal to zero, the zero value is considered an absolute minimum.

Thus, in order to avoid a local minimum, the mask sequence comparator of FIG. 6 outputs the clock signal to row, column registers that store the row and column of the corresponding feature mask location relative to the scan window 16. The address may be stored either in the mask sequence comparator or in the control unit 40. In addition, the mask sequence comparator 36 may include a circuit which automatically triggers the next feature mask if the NFME is detected to be a value of zero.

As shown in FIG. 7, the feature mask $18_1$ continues its scan as shown in row 82 from the left-most position at scan 82a to the right-most position as scan 82d. The addresses and values of the local minima for scans 82b and 82c are stored, preferably in the control unit 40. The scanning is continued by shifting the feature mask $18_1$ down one row as shown in scan sequence 84. During scan 84a, the error is determined to be a value of two (2). The feature mask $18_1$ is then shifted to the right by one (1) column to perform scan 84b, at which point a match is found with an error value of zero indicating an absolute minimum. At this point, the next feature mask $18_2$ of the sequence is loaded to continue at the next address where the first feature mask was matched. As shown at scan 84c, the second feature mask $18_2$ of the sequence immediately obtains a match by obtaining an error value of zero. The address corresponding to the match is stored, and the next feature mask $18_3$ is loaded for scan analysis.

As shown in scan sequence 86, the next feature mask $18_3$ begins scan at the next address after the match of feature mask $18_2$, in scan 86a. As shown in scan 86a, the resulting error is the value of 2. Continuing the scan to scan 86b, the feature mask $18_3$ obtains an error value of one 1, rendering the local minimum. The address location (row/column, error value) is stored and the scan continues. Scan 86c returns an error value of 2, and scan 86d returns an error value of 1, which is stored as a new local minimum. The feature mask $18_3$ is shifted down one row in scan sequence 88, and an error value of 2 is returned for scan 88a. In scan 88b, an exact match is obtained with an error value of 0. Thus, the address in scan 88b is determined to be a "better value" (i.e., having a lower error) than the scans 86b and 86d. The scan continues with the next feature mask $18_4$, which continues at the next address location. At scan 88c, the feature mask $18_4$ is determined to be an exact match with an error value of 0. Thus, as shown in FIG. 7, the scan sequence is performed using the feature mask sequence of feature mask $18_1$, $18_2$, $18_3$, and $18_4$, to recognize the letter "D". During the procedure, local minima are stored, in the event that a "better" error value is subsequently obtained for the corresponding feature mask.

Figure 8:
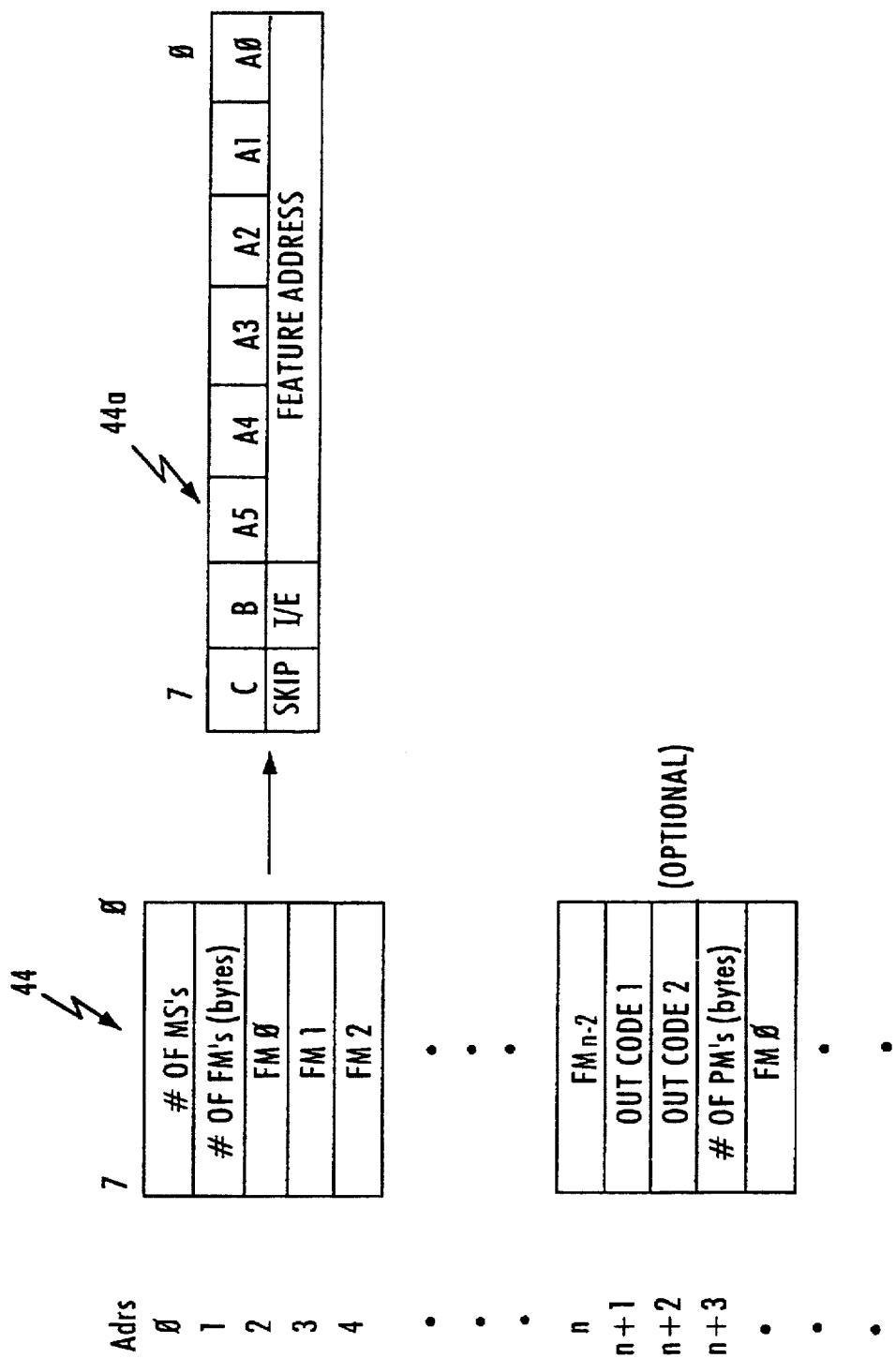
FIG. 8 is an illustration of a data format of the mask sequence memory shown in FIG. 3.

FIG. 8 illustrates an exemplary structure of the mask sequence memory 44 disclosed in FIG. 3. As shown in FIG. 8, the mask sequence memory 44 is arranged as a series of characters having corresponding mask sequences. Specifically, at address 0, the mask sequence memory 44 identifies the number of mask sequences that are stored in the memory. The value stored at address 0 will be loaded into a first counter register (ENDMS) in the control unit 40 in order to identify when all the character candidates have been compared to a scanned image. The next address location (address=1) includes data identifying the number of feature masks (e.g., number of bytes) that are present in the first feature mask sequence corresponding to the first recognized character. The next memory location (address=2) includes the first feature mask data word 44a. The data identifying the number of feature masks will be loaded into a second counter register (ENDFM) in the control unit 40.

The feature mask word 44a includes a 6-bit feature mask address (A0–A5) that identifies the address of the desired feature mask stored in the feature mask memory 38. The next bit of the feature mask word 44a (B) identifies whether the feature mask should be considered positive polarity feature mask or a negative polarity feature mask.

The last bit of the feature mask word 44a is a SKIP flag which identifies whether the feature mask should continue with a horizontal scan for left-to-right generated scans, or should force a carriage return/line feed in the scan window. A more detailed description of the carriage return/line feed is found below.

As shown in FIG. 8, the mask sequence memory 44 stores each of the feature mask words 44a in the order corresponding to the logical sequence of the mask sequences for each character. After the end of the last feature mask of a sequence, the next memory location stores the output character identification code (such as the character ASCII code, in either 8-bits or 16-bits).

Figure 9A:
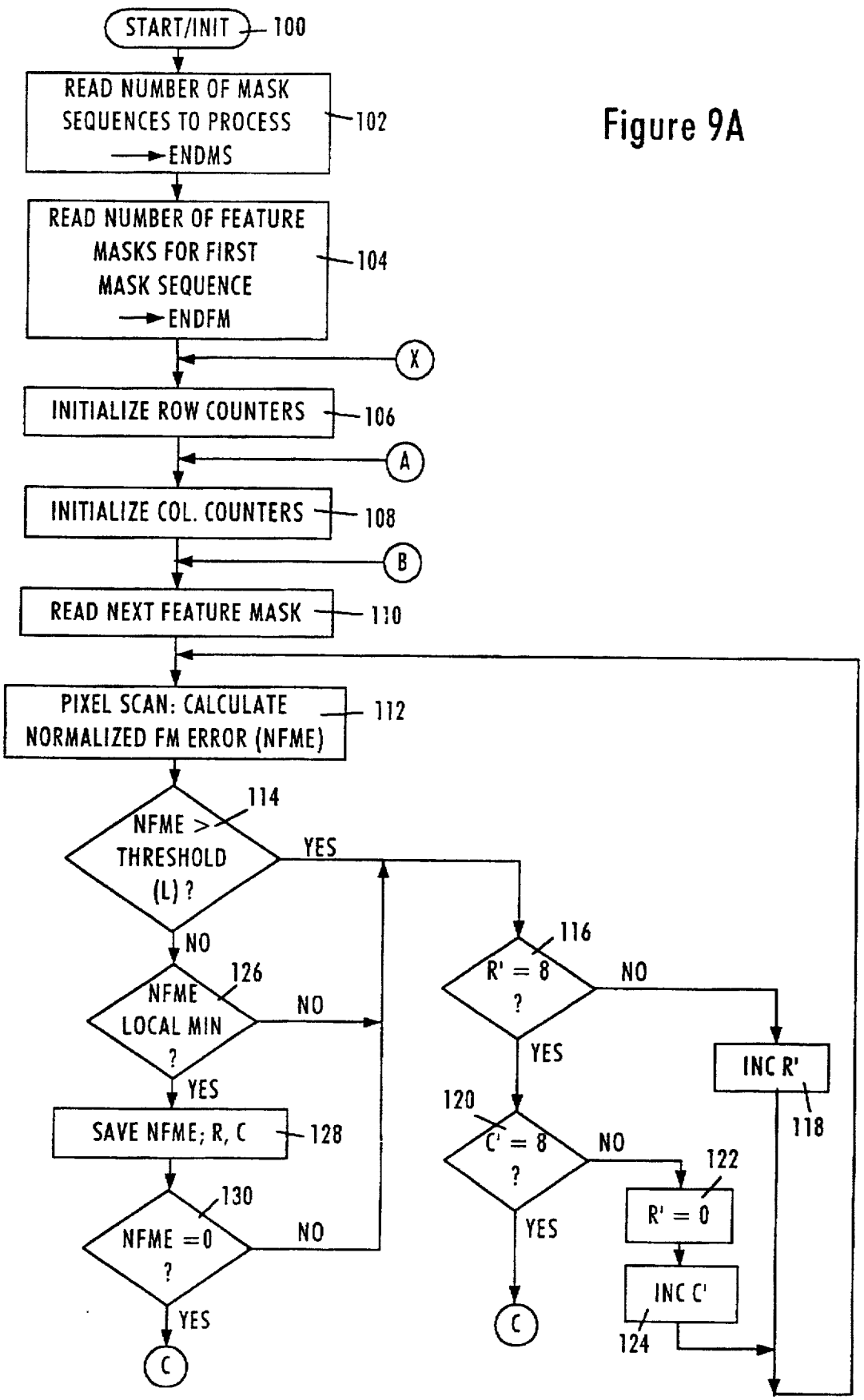
FIGS. 9A and 9B are a flow diagram showing the handwritten character translation method according to the preferred embodiment of the present invention.
Figure 9B:
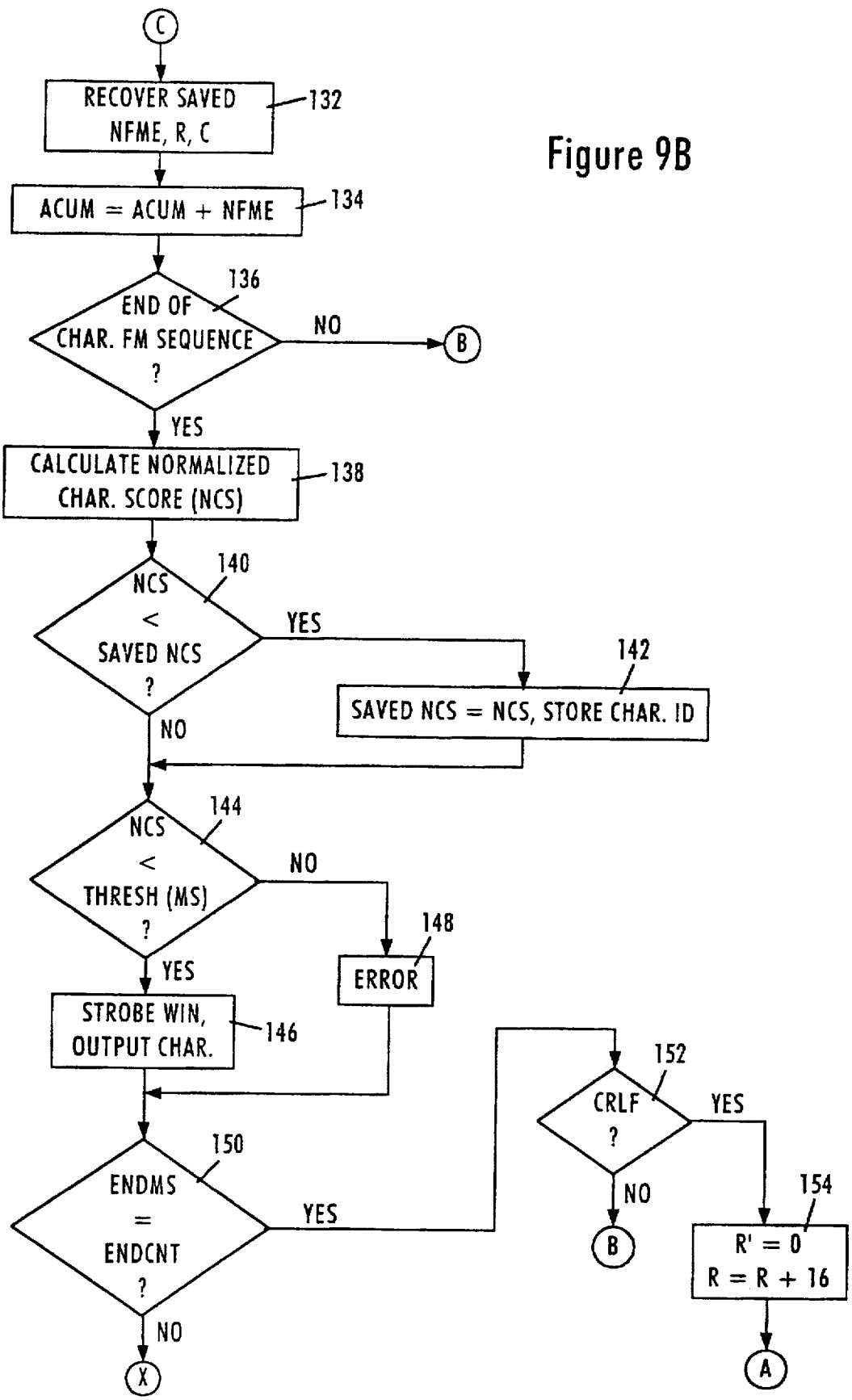

FIGS. 9A and 9B disclose the method of performing character translation using the disclosed character translator 30 according to the preferred embodiment of the present invention. For the sake of simplicity, the disclosed method is shown as a sequential process with nested loops. Specifically, the disclosed method is arranged to compare the scan window 16 with a plurality of characters, each character having at least one mask sequence stored in the mask sequence memory 44. For each mask sequence, a normalized character score is calculated, and the address of the character image (row/column) in the scan window is stored. Thus, for each mask sequence, the character translator 30 determines a normalized character score (NCS), the row and column of the character image, and the character ID (ASCII code). For each feature mask of the sequence, the character translator 30 calculates a normalized feature mask error for each scan sequence location as shown in FIG. 7. If a local minimum is determined, a corresponding row and column address is stored along with the minimum NFME until the scan sequence is completed. After the minimal NFME is determined for the entire scan, the minimal NFME is accumulated with the remaining minimal NFME's corresponding to the feature masks of the sequence.

As shown in FIG. 9A, the process starts at step 100, whereby the mask sequence memory address counter (MSADRS) in the control unit 40 is set to 0. In addition, all row/column address registers, and counter registers for counting the number of character candidates (ENDCNT) are set to 0.

The control 40 of the character translator 30 addresses the first address location of the mask sequence memory 44 (address=0) in step 102 in order to obtain the number of mask sequence to process. The number of mask sequences stored in the mask sequence memory 44 is loaded into a mask sequence endcount register (ENDMS), and the control 40 then increments the counter MSADRS. The control 40 then addresses the next location of the mask sequence memory 44 in step 102 (MSADRS=1) to obtain the number of feature masks for the first mask sequence in step 104. The number of feature masks is loaded into the feature mask endcount register (ENDFM) and the mask sequence memory address counter (MSADRS) is incremented.

The control unit 40 comprises two sets of counters, a window counter (R, C) identifying the location of the scan window 16, and a scan counter (R', C') for tracking scans along portions of the scan window 16. The window counter data is supplied to the control 40, for example by the external memory as the pixel data for the scan window 16 is received by the HCT 30. Step 106 is performed whereby a row scan counter (R') in the control unit 40 is set to 0. The column scan counter (C') is initialized in step 108 to begin the scan at the top-left of the scan window. The control 40 then reads the next address location of the mask sequence memory 44, which includes the feature mask data word 44a of the feature mask to be processed. The control 40 accesses the feature mask memory based upon the address stored in the feature mask data word 44a, and configures the row, column counters (R, C) and the fuzzy processor as necessary in view of the B, C control bits (step 110). At the end of step 110, the mask sequence memory address counter (MSADRS) is incremented.

In step 112, the character translator 30 begins the pixel scan for the first portion of the scan window 16, preferably beginning with the upper left-hand corner of the scan window 16. The scan controller 32 provides the scan window pixel information via the SW signal path to the fuzzy processor 34, whereby the fuzzy processor 34 simultaneously processes the scanned pixel data. At the end of step 112, the fuzzy processor 34 calculates the 8bit normalized feature mask error (NFME) for the first scan.

In step 114, the fuzzy processor 34 determines whether the calculated NFME is greater than the predetermined feature mask threshold (L) stored in the memory 66 (see FIG. 4). If the calculated NFME is greater than the stored threshold (L), then the calculated NFME is considered an unacceptable match, and the row counter (R') is checked in step 116 to see whether the top-to-bottom scan has reached the bottom of the scan window 16. If the bottom is not reached, the feature mask is shifted down one row by incrementing the row counter in step 118, and the pixel scan process at step 112 is repeated. If, however, the row counter (R') in step 116 is at the bottom of the row, then the column counter (C') is checked to see whether the last column has been scanned, thereby indicating the entire scan window 16 has been processed by the corresponding feature mask in step 120. If the column counter does not indicate the right-most column of the scan window 16, the row counter (R') is reset in step 122, and the column counter (C') is incremented in step 124 to shift the feature mask to the next column for processing in step 124. The next pixel scan is thereafter performed in step 112.

Returning to step 114, if the NFME is not greater than the threshold, then the NFME is considered an acceptable candidate, and the mask sequence comparator 36 uses the comparator 70 in FIG. 6 to determine in step 126 if the NFME is a local minimum. If the mask sequence comparator determines that the NFME is a local minimum, then the NFME value is stored, as well as the row and column address (R, C) in step 128. The NFME is also checked at step 130 to determine whether the NFME value is an absolute minimum with a value of 0; if the NFME is not an absolute minimum, the scan sequence continues at step 116. Thus, FIG. 9A shows the scan sequence to determine a minimum NFME for one feature mask that is successively scanned across the scan window 16 to determine a minimum NFME for the feature mask.

FIG. 9B discloses the continuation of the process after the comparison of the feature mask across the entire scan window 16 has been performed. As shown in FIG. 9B, the next step after performing the feature mask comparison over one scan window 16 is to recover the saved NFME and address (R, C) in step 132 by the control unit 40. As shown in FIG. 6, step 132 is automatically performed by the register 72. In step 134, the recovered NFME value is added to the accumulated value (ACUM) for the feature mask sequence in step 134 by the accumulator 76 shown in FIG. 6. In step 136, the control 40 checks whether the process has reached the end of the feature mask sequence of the corresponding character by checking whether the memory sequence address counter (MSADRS) corresponds to the stored number of feature masks for the first sequence (ENDFM). If the end of the character sequence has not been reached, the process returns via path B to read the next feature mask at step 110. If, however, the end of the feature mask sequence has been reached for the corresponding character, the process continues to step 138 to calculate the normalized character score (NCS), which is performed by the divider circuit 78 in FIG. 6. At the end of step 138, the ENDCNT counter register is incremented.

The process then proceeds to step 140, to determine whether the normalized character score (NCS) is less than the saved normalized character score, as compared by the character sequence comparator 68, shown in FIG. 6. If in step 140, the normalized character score (NCS) is less than the saved normalized character score (SAVED NCS), then the NCS is saved in register 77, and the character ID of the character corresponding to the mask sequence is stored. Although the NCS is disclosed in FIG. 6 as being stored in the register 77, the saved NCS and character ID may also be stored in internal registers at the control unit 40.

The next step of the process shown in FIG. 9B checks in step 144 whether the NCS is less than the mask sequence threshold (MS). As shown in FIG. 6, the threshold comparison may be performed by the comparator 80 for each normalized character score. Alternatively, the threshold comparison may be deferred for the SAVED NCS after all the characters have been checked. If the NCS is less than the threshold, the process proceeds to step 146, whereby the comparator 80 outputs a character match signal. If desired, the normalized character score (NCS) is output along with the character ID to the host processor as a possible character candidate. Alternatively, the control 40 may store the normalized character store and the corresponding character ID in response to the character match signal in order to store the four best character candidates and their respective scores.

If, however, in step 144 the saved NCS is greater than the mask sequence threshold stored in register 81, the comparator 80 may output an error flag in step 148, which may be used by the control 40 or the host processor for statistical analysis in comparison with the normalized character score. For example, if the number of error flags exceed a predetermined level, the control 40 may increment the mask sequence threshold (MS) in register 81 to a higher level, thereby enabling a higher level of character candidates; conversely, if during the recognition procedure, there are relatively few error flags generated by the comparator, there may be the possibility that the error of threshold is not low enough, and that too many characters are being erroneously recognized as character candidates. In such a case, the control 40 may decrement the mask sequence threshold (MS) to a lower level in order to require a lower accumulated error to improve accuracy. Alternatively, the NFME threshold (L) may be adjusted. It will be appreciated by those skilled in the art that the optimum setting of the mask sequence threshold can be determined based on statistical analysis techniques, for example based upon a standard distribution of anticipated errors.

After steps 146 and 148, a process checks in step 150 whether all the mask sequences for the corresponding characters have been checked by determining whether the character counter (ENDCNT) has reached the value of ENDMS retrieved from the mask sequence memory 44. If all the characters have not been checked, the process returns to step 106 to reinitialize the row and column (R', C') counters to repeat the process for another mask sequence of a corresponding character. Alternatively, the row and column counters can be reloaded with the address saved in step 125. If, however, all the characters have been checked, then the process has been completed for the one scanned image.

At this point, the process is ready to proceed to the next character image for recognition. The process checks in step 152 whether a carriage return line feed (CRLF) has been set. If not, the character translator uses the saved row, column values from the last saved NFME to continue the recognition process at step 110 from the location of the last recognized character. In other words, referring to FIG. 1A, if the process is able to recognize the letter "B" of "Boston" whereby the saved RC is a pixel location in the lower right-hand corner of the letter "B", the recognition process would continue from that same pixel in order to start recognition of the next letter, namely the second letter "o". As will be appreciated by those skilled in the art, the scan controller 32 will obtain any additional information from the remote scan memory in order to update the scan window 16.

If in step 152 a carriage return line feed is set, then the local loop row counter R' in step 154 is set to 0, and the row counter R is incremented by sixteen (16) in order to get the scan window pixel data for the next row of the observation universe. The process then returns via path A to step 108 to initialize the column counter.

Figure 10:
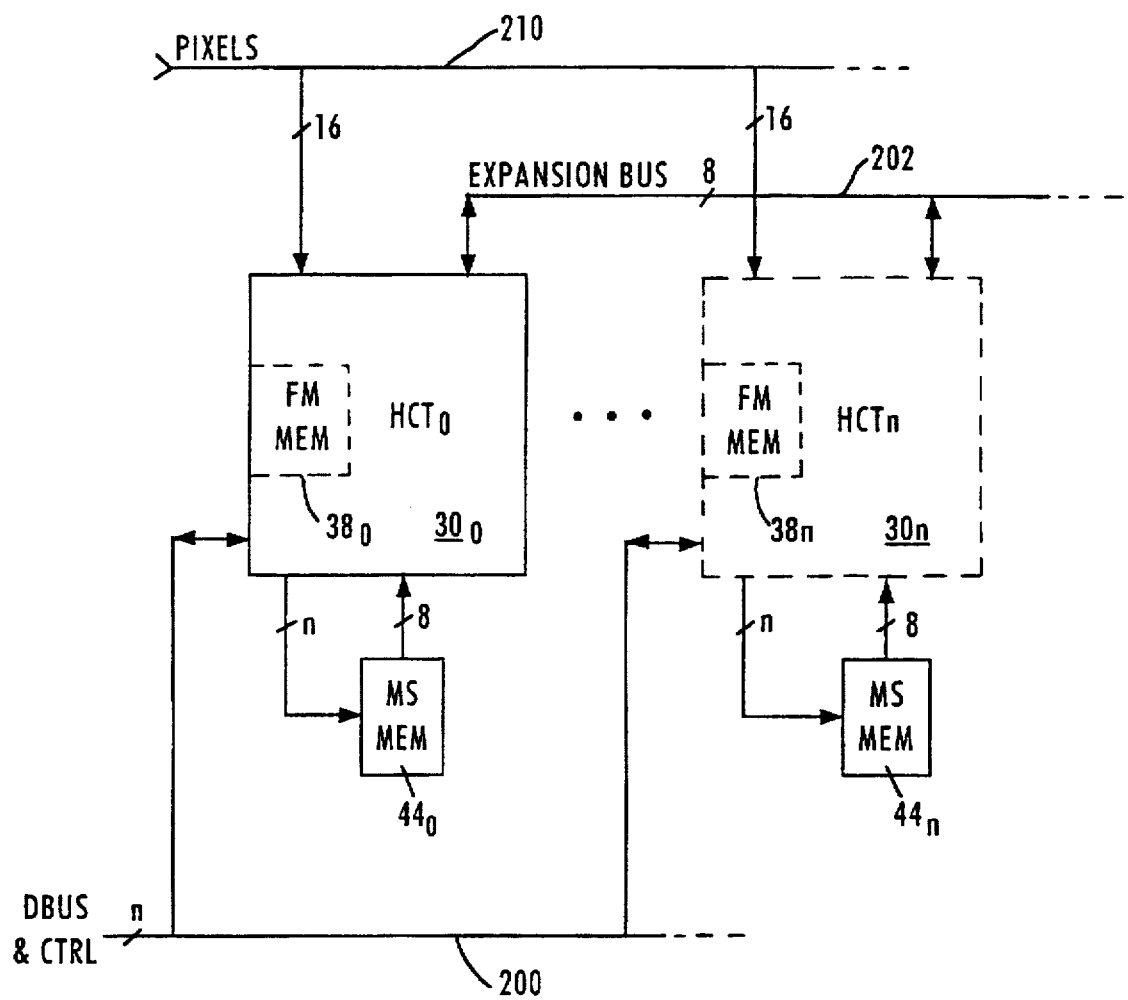
FIG. 10 is a block diagram illustrating an expansion system for parallel processing applications using the handwritten character translator of the present invention.

FIG. 10 shows a typical implementation of the HCT device 30 in a parallel configuration using a plurality of HCT devices for parallel processing. As shown in FIG. 10, each of the HCT's 30 have corresponding feature mask memories 38 and mask sequence memories 44. The HCT's 30 perform parallel processing by the use of an expansion bus 202, whereby the expansion bus 202 supplies the minimum error value (SAVED NCS) between the HCT devices 30. Each of the HCT devices 30 are also coupled to a data and control bus 200 which is coupled to a host processor (not shown). As known to those skilled in the art, each of the HCT devices may be adapted to be addressable individually by the host processor. Each of the HCT devices 30 receive the pixel scan data from the PIXELS signal path 210, which may either be supplied by a scan controller or by the host processor.

During operation, each of the HCT devices 30 will determine an optimum character candidate from the corresponding mask sequence memories 44. Each of the HCT devices 30 output onto the expansion bus 202 the corresponding saved normalized character score (SAVED NCS) representing the character having the minimum error from the corresponding mask sequence memory 44. The expansion bus returns the minimal of the supplied values (MIN NCS) to each of the devices. Thus, by checking the supplied value (MIN NCS) on the expansion bus 202, a HCT device 30 can determine whether it has the winning character by checking the corresponding SAVED NCS value.

Figure 11:
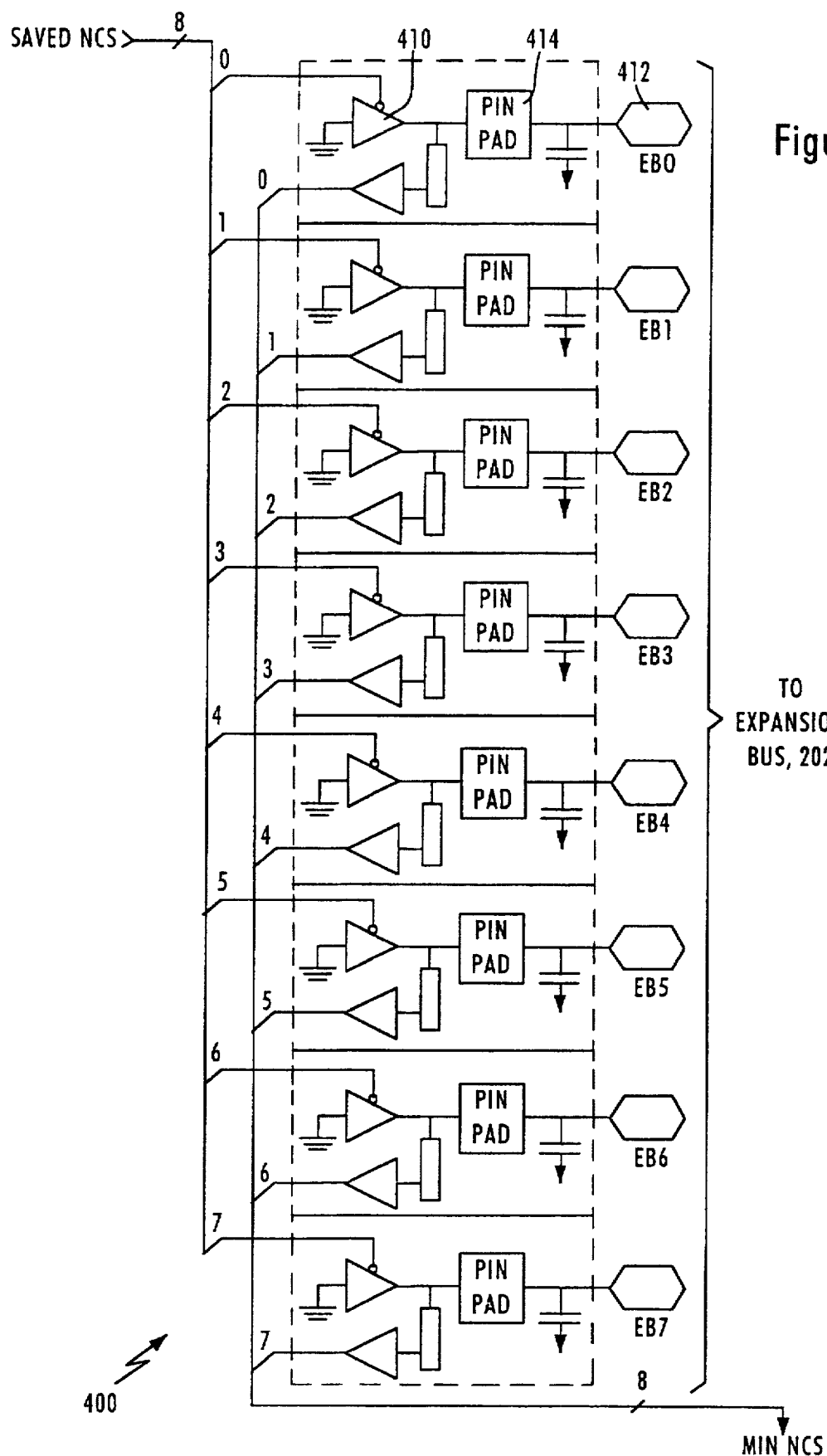
FIG. 11 is a circuit diagram of an expansion bus interface used to accommodate the parallel processing functions of the expansion bus shown in FIG. 10.

FIG. 11 shows an exemplary circuit diagram of the expansion bus interface 400 used in the control circuit 40 of the HCT 30. As shown in FIG. 11, each bit of the signal output (SAVED NCS) to the expansion bus 202 drives a tristate buffer 410. At the same time, the signal data from the expansion bus (MIN NCS) is conducted by an electrode 412 and a pin-pad 414. As a result, if a signal path on the expansion bus 202 is a logic 0, the output of the tristate buffer 410 is also forced low. Therefore, the tristate buffer 410 effectively functions as an open collector output so that even though the SAVED NCS signal may be high, the MIN NCS signal will be low if the corresponding bit on the expansion bus is low. Therefore, the expansion bus will always supply the minimum values supplied of all the devices 30. Although not shown, the control circuit 40 would also include a feedforward network comprising NAND gates to drive the expansion bus interface 400. A more detailed description of the expansion bus interface is found in commonly-assigned U.S. Pat. No. 5,272,657, the disclosure of which is incorporated herein in its entirety by reference.

As discussed above, the disclosed embodiment provides a low-cost device that provides successive comparisons in a serial manner. However, the device may also be implemented as a parallel device providing high-speed operation for rapid recognition. An exemplary implementation of the handwritten character translator using a parallel implementation and the expansion bus interface is disclosed in FIG. 12.

Figure 12:
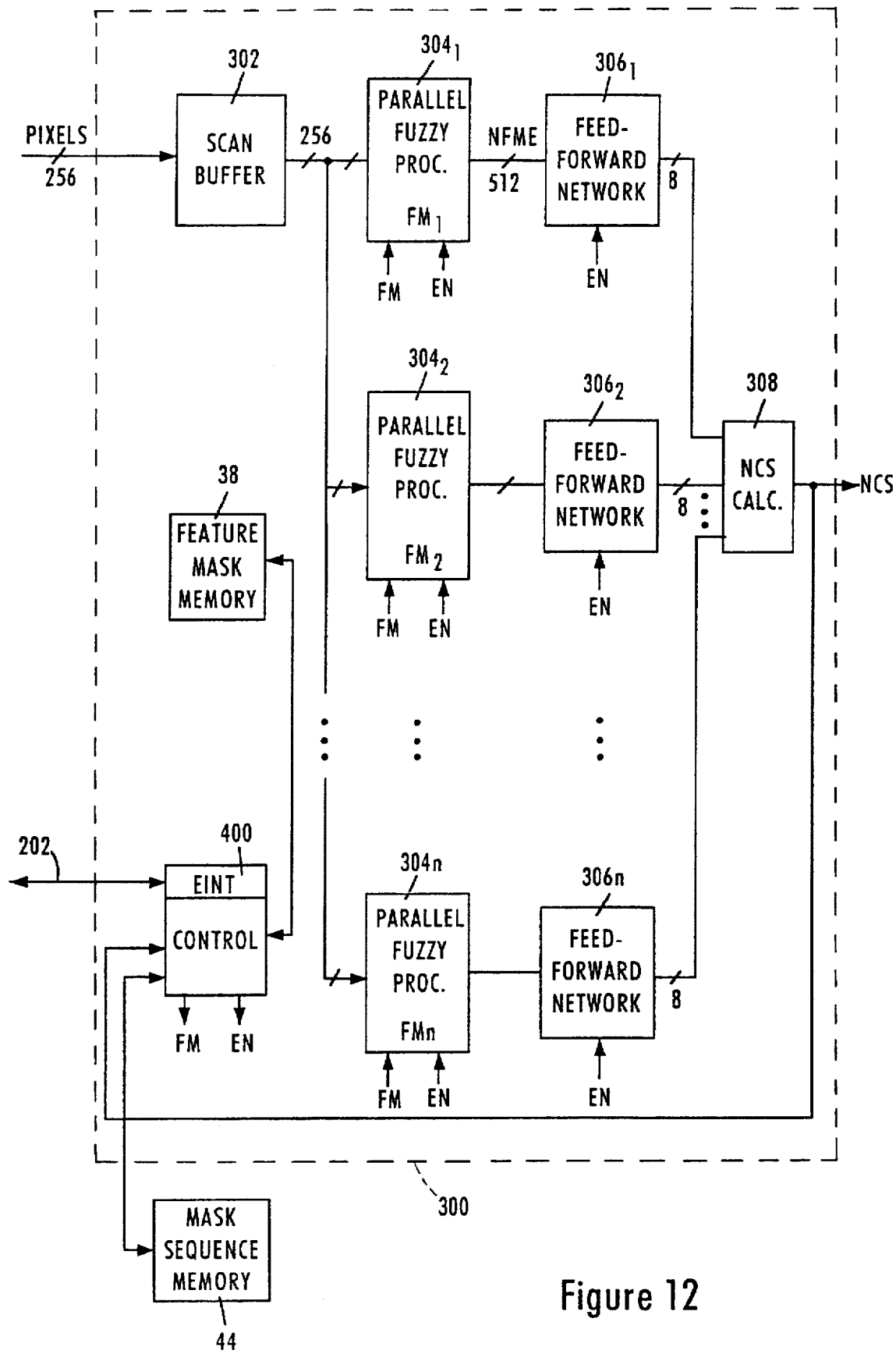
FIG. 12 discloses an alternative embodiment showing a parallel implementation of the handwritten character translation method of the present invention.

As shown in FIG. 12, the handwritten character translator 300 comprises a scan buffer 302 that simultaneously receives all 256 pixels from the scan window 16 stored in the memory. The scan buffer 302 may be implemented, for example, as a dynamic RAM device (DRAM). The 256 pixels are simultaneously provided to a plurality of parallel fuzzy processors 304, each similar in structure to the fuzzy processor 34 shown in FIG. 3. Each fuzzy processor 304 comprises 4,096 three-dimensional fuzzifiers 50 as shown in FIG. 4. Thus, each of the parallel fuzzy processors 304 simultaneously calculate an error value for the feature mask being processed across the entire scan window, as performed from steps 112 to 120. Thus, rather than performing successive calculations of NFME values for the feature mask at different locations relative to the scan window, these NFME calculations are performed for one feature mask in parallel in each parallel fuzzy processor 304. Each of the parallel fuzzy processors 304 effectively comprise sixty-four (64) of the fuzzy processors 34 in order to simultaneously output sixty-four (64) NFME values for the feature mask as different scan locations, respectively.

The sixty-four (64) NFME values are supplied to a feature mask feedforward network 306 in order to determine the minimum NFME value for the feature mask. The feature mask feedforward network 306 comprises a neural-type multipath feed forward network of the type disclosed in commonly-assigned U.S. Pat. Nos. 5,272,657 and 5,245,695 to Basehore, the disclosures of which are incorporated in their entirety by reference. The multipath feedforward network 306 is specially dedicated to determining a minimum rule term for each rule to be processed (i.e., the parallel NFME inputs). The feature mask feed forward network 306 outputs the minimum NFME score for the feature mask across the entire scan window. The output of the feed forward network 306 is supplied to a normalized character score calculator 308, which in parallel performs the functions of the accumulator circuit 76 and the divider circuit 78 in FIG. 6 in order to obtain the normalized character score (NCS).

Thus, each parallel fuzzy processor 304 and feedforward network 306 determine in parallel the minimum NFME for each feature mask of the scan sequence. Since different mask sequences will have a different number of feature masks within the sequence, the parallel character translator 300 comprises a control section 320 which outputs the feature mask information to the respective fuzzy processors 304 and feed forward networks 306, as well as an enable signal to disable any fuzzy processors 304 or feed forward 306 that are not in use. The control 320 also includes the expansion bus interface (EINT) 400 as shown in FIG. 11. Thus, an array of at least 26 parallel character translators can be used to simultaneously process a scan window to translate a character as one of the characters of the alphabet. Other parallel variations are possible, depending on the desired cost to performance ratio.

Thus, the present invention provides an advantageous technique using fuzzy logic for determining character candidates for character images based upon a predetermined set of feature masks. The feature masks are used to establish mask sequences corresponding to an identified character or symbol. As will be recognized in the art, different scan sequences may be used to scan for images within the observation universe 10.

An example of a modified scan sequence involves defining three types of feature masks, namely column-0 (C0) feature masks, RLF feature masks, and an RC feature mask. These feature masks are defined by their relative position within a scan window. For example, the C0 feature mask is defined to always start at column 0. The RLF-type feature mask is defined as a feature mask corresponding to the end of a row that will generate a return (R) to column 0 and a line feed (LF) to the next row. Finally, an RC feature mask (row/continuation) is defined as being embedded between the C0 and RLF-type feature masks. According to the arrangement of feature masks during the scan, there may be a plurality of RC-type feature masks within a row, however a row will only contain only one C0 feature mask and only one RLF feature mask.

The modified scan always starts at location Row=0, and Column=0 of the scan window. According to this modified scan sequence, this scan always progresses from left to right on a given row. When a match is found, the row and column identifying the top boundary of a scan section are saved in temporary "top" registers (TOPR) and (TOPC), respectively. A match is found when the normalized error for the mask is zero (0), or is determined to be the first true minimum. As discussed above with respect to FIG. 7, the entire scan window would generally need to be checked if a zero (0) was not found. Thus, if multiple equal minima are found, the first address value, namely the lowest numbered row and column, are saved. If for any mask the minima is found to be equal to or greater than the predefined threshold, operation for this mask sequence is aborted and it is assigned a total error equal to the threshold. When the minima is found and its location is stored in the TOPR and TOPC registers, the scan continues by analyzing the next column zero type feature mask. The location for the next column zero mask minima was found stored in temporary registers Bottom-R and Bottom-C for the row and column, respectively.

The locations now stored in the registers TOPR, TOPC, Bottom-R and Bottom-C define a new range for analyzing symbols using the RC-type feature masks. Specifically, the range is bounded by TOPR and TOPC in the upper-left corner and Bottom-R and Bottom-C in the lower-right corner. Thus the RC feature mask can only search for a match within this bounded area. Upon finding a match, the temporary registers TOPR and TOPC are updated with the new position.

When the RLF mask finds its match, the scan control modifies both the top and bottom temporary registers. The top register TOPR is set equal to Bottom-R, and TOPC is set equal to Bottom-C. Thereafter, the next C0 feature mask is matched, and stored in the Bottom-R and Bottom-C registers. Thus, the scan area for each C0 feature mask is progressively shortened in the vertical direction. Also, the scan area for each RLF mask and RC mask in the same mask row become shortened both vertically and horizontally.

Thus, the scanning procedure may be shortened. If, however, any mask fails the threshold check, the sequence would be aborted, returning to the original scan technique.

In addition, scan enhancements may be made to improve the scanning procedure. For example, for a given mask sequence, the HCT verifies that all first column feature masks are found within plus or minus and columns of each other. After finding a winning mask sequence having a NCS score less than the predetermined threshold, the first feature mask (corresponding to the upper left-hand corner of the scan window) is examined. If the first feature mask is below a predetermined threshold, then only the remaining mask sequences who also have the same first feature mask are examined. This procedure may increase the recognition speed and reduce the number of mask sequences that are lower than the character threshold.

In addition, for a given mask sequence, the HCT may verify that all first column feature masks are found within a given membership of each other. In this case, the degree of membership is added to the feature masks total error before the data is compared to the threshold. In this way, a fuzzy relational parameter is included in the solution. Thus, the normalized feature mask error (NFME) would be calculated according to the following equation:

$$NFME = \frac{\left[\sum_{i=1}^{n}(I_iW_i) + \sum_{j=1}^{m}(E_jW_j) + DW_d\right]64}{n+m}$$

whereby "n" g equals the number of inclusive pixels in the feature mask, "m" equals the number of exclusive pixels in the feature mask, "i" equals the number of active pixels from the scan window 16 identified as being inclusive, "E" equals the number of active pixels from the scan window 15 identified as belonging to an exclusive pixel, "W" equals the weight of the membership function as shown as membership functions 24 and 26 of FIG. 1D, and "D" equals the distance of the active pixel to the center of the membership function.

Figure 13:
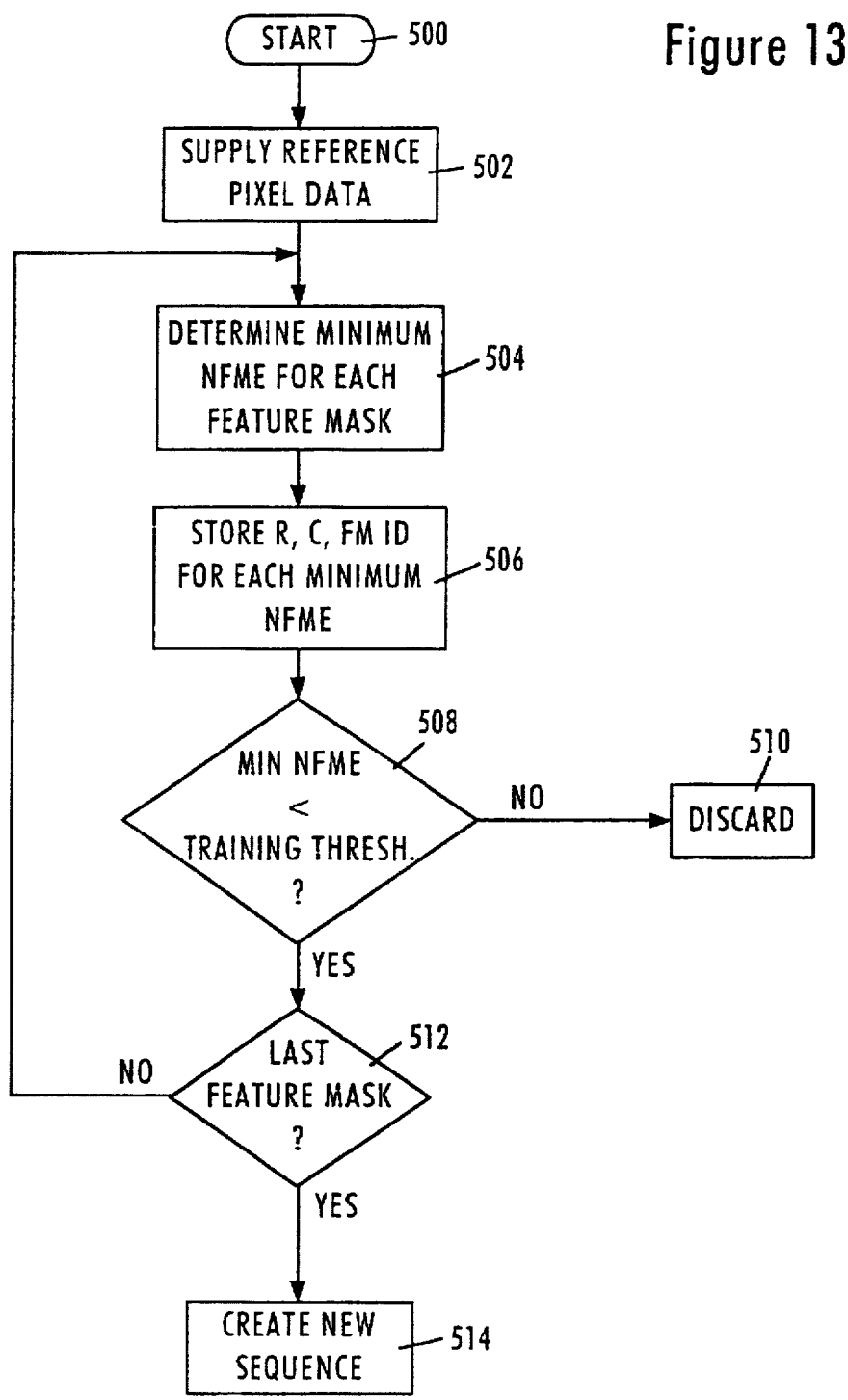
FIG. 13 discloses a training method according to the present invention.

FIG. 13 discloses a training method according to the present invention. The disclosed HCT 30 determines images as identified characters based on a predetermined table of feature masks representing primitives. According to the present invention, initialization for training begins at step 500. The reference character pixel data is supplied for the fuzzifiers in step 502. Training of the HCT 30 may be accomplished by moving each feature mask through the scan window comprising pixels of scanned images representing reference images. According to the preferred training example, each feature mask is moved through the scan window in step 504 to find the minimum NFME in the scan window, and a set of temporary registers record the location of the lowest error in step 506. The sample character to be trained should be the only character in the scan window. Each temporary register is preferably 16 bits, capable of storing the identifier value of the feature mask (feature mask address), and the row and column of the least error winner.

If a feature mask if found at multiple locations, whereby each of the multiple locations have equal minima resulting in ties, all the locations are stored. Feature masks that do not have an error value below the training threshold in step 508 are discarded from the current mask sequence in step 510. When the last feature mask has been checked in step 512, the temporary registers are interrogated. Feature masks are chained together to create a mask sequence in step 514, starting from the lowest row/column location to the highest. As a result, the resulting mask sequence provides a sequence of specified feature masks that should be recognized in the specific sequence based upon the scan direction.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for recognizing a handwritten symbol from a group of predetermined symbols, comprising the steps of:

storing in a memory at least one sequence of feature masks for each of the predetermined symbols;

supplying pixel information corresponding to a scan window to a plurality of fuzzifier circuits, said scan window including the handwritten symbol, each of said fuzzifier circuits corresponding to a membership function having a center corresponding to a selected pixel from one of said feature masks;

supplying feature mask pixel information to said fuzzifier circuits;

outputting from each of said fuzzifier circuits a weighted error signal calculated between the selected pixel of said one feature mask and the corresponding pixel information from said scan window;

accumulating said weighted error signals from each of said fuzzifier circuits to obtain a normalized feature mask error signal for each of said feature masks with respect to said scan window;

accumulating the normalized feature mask error signals for each stored sequence to obtain a normalized symbol error signal; and comparing the normalized symbol error signals for the stored sequences to determine a minimum normalized symbol error signal corresponding to one of said predetermined symbols, said handwritten symbol being recognized as corresponding to said one predetermined symbol.

2. A method as recited in claim 1, wherein said storing step comprises the steps of:
generating a pixel pattern for each of said predetermined symbols;
designating pixels for each of said pixel patterns as one of an inclusive pixel, an exclusive pixel, and a don't care pixel; and
storing the designated pixels for each of said pixel patterns in said memory.

3. A method as recited in claim 2, wherein said designated pixel storing step comprises the steps of:
generating a two-bit word for each of said designated pixels; and
programming said two-bit words for each of said designated pixels into a programmable read-only memory.

4. A method as recited in claim 1, wherein said scan window pixel supplying step comprises the steps of:
selecting a language for said handwritten symbol; and
supplying said pixel information in accordance with a scan direction corresponding to said language.

5. A method as recited in claim 1, further comprising the steps of:
arranging said fuzzifier circuits as three-dimensional fuzzifier circuits each having a predetermined coverage area;
generating weighted distance coefficients corresponding to a spatial distance between a pixel within said predetermined coverage area and a center of said predetermined coverage area, said center of said predetermined coverage area corresponding to said center of said corresponding membership function.

6. A method as recited in claim 5, wherein said arranging step comprises the step of assigning each of said fuzzifier circuits a predetermined portion of said scan window as said predetermined coverage area.

7. A method as recited in claim 6, wherein said predetermined coverage area has row and column dimensions of seven pixels by seven pixels, respectively.

8. A method as recited in claim 1, wherein said normalized feature mask error signals accumulating step comprises the steps of:
(1) receiving a plurality of said feature mask error signals for each of said feature masks, corresponding respective portions of said scan window;
(2) determining a first minimum, from said normalized feature mask error signals corresponding to said respective portions of said scan window, for each of said feature masks;
(3) accumulating said first minimum values of said corresponding feature masks in accordance with said at least one sequence for each of said feature masks; and
(4) normalizing said accumulated first minimum values in accordance with said corresponding at least one sequence.

9. A method as recited in claim 1, further comprising the steps of:
supplying training character pixel data representing a training character to said fuzzifier circuits;
determining a lowest error for each of said feature masks in response to said corresponding normalized feature mask error signals;

storing a recognition location for each of said feature masks corresponding to said lowest error;
arranging the feature masks having said corresponding lowest error less than a training threshold into a new mask sequence, said feature masks in said new mask sequence being arranged in accordance with the respective recognition locations.

10. In a device comprising a sequence memory, a primitive mask memory, and a scan controller supplying pixel scan data of a scanned character within a scan window, a method for identifying said scanned character as one of a plurality of recognized characters, comprising the steps of:
reading primitive sequences from said sequence memory, each of said primitive sequences identifying primitive elements and corresponding to one of said recognized characters;
reading primitive mask pixel data from said primitive mask memory in accordance with said sequences, said primitive mask memory storing said primitive mask pixel data as a plurality of primitive masks each corresponding to one of said primitive elements;
supplying said primitive mask pixel data to a plurality of fuzzifiers, said fuzzifiers corresponding to respective primitive mask pixels of at least one of said primitive masks, said primitive mask pixels defining membership function centers of said fuzzifiers, respectively;
outputting from said scan controller said pixel scan data to said fuzzifiers in groups corresponding to regions of said scan window, respectively;
outputting primitive mask distance errors from each of said fuzzifiers, each of said primitive mask distance errors identifying a distance error between said corresponding primitive mask pixel and said corresponding region of said scan window;
determining a minimal primitive error for each of said primitive masks of said sequences in accordance with said corresponding primitive distance errors;
calculating a character error for each of said sequences in accordance with said corresponding minimal primitive errors of said respective primitive masks; and
identifying said scanned character as said one recognized character in response to the corresponding sequence having a minimal character error relative to said calculated character errors.

11. A method as recited in claim 10, wherein said fuzzifiers are three-dimensional fuzzifier circuits each having a predetermined coverage area, the method further comprising:
generating weighted distance coefficients corresponding to a spatial distance between a pixel within said predetermined coverage area and a center of said predetermined overage area, said center of said predetermined coverage area corresponding to said center of said corresponding membership function.

12. A method as recited in claim 11, wherein each of said fuzzifier circuits are assigned a predetermined portion of said scan window as said predetermined coverage area.

13. A method as recited in claim 12, wherein said predetermined coverage area has row and column dimensions of seven pixels by seven pixels, respectively.

14. A method as recited in claim 10, further comprising the steps of:
supplying training character pixel data representing a training character to said fuzzifiers;
determining a lowest error for each of said feature masks in response to said corresponding normalized feature mask error signals;

storing a recognition location for each of said feature masks corresponding to said lowest error;

arranging the feature masks having said corresponding lowest error less than a training threshold into a new mask sequence, said feature masks in said new mask sequence being arranged in accordance with the respective recognition locations.

15. A character translator, comprising:

a feature mask memory storing pixel data for a plurality of feature masks, said pixel data for each feature mask corresponding to a predetermined primitive element;

a plurality of fuzzifiers, each calculating a distance error signal of a scan region with respect to a center pixel representing a membership function center of a membership function region;

control means for selectively supplying said pixel data for each of said feature masks to said fuzzifiers in accordance with mask sequences stored in an external memory;

a scan controller, responsive to pixel scan data of a scanned character within a scan window, for supplying said pixel scan data to said fuzzifiers in groups corresponding to regions of said scan window, said fuzzifiers each outputting distance error signals with respect to said pixel scan data and said corresponding pixel data of said feature masks;

means for determining a minimum normalized feature mask error for each of said feature masks in response to said distance error signals;

means for calculating a normalized character score in response to said minimum normalized feature masks for each of said mask sequences, each of said normalized character scores representing a recognition error of a candidate character for said corresponding mask sequence.

16. A translator as recited in claim 15, further comprising means for determining a minimum normalized character score from said normalized character scores generated by said calculating means; and means for comparing said minimum normalized character score to a recognition threshold and outputting a character match signal in response thereto.

17. A translator as recited in claim 16, further comprising an expansion bus interface for outputting said minimum normalized character score onto an expansion bus, said expansion bus interface receiving from said expansion bus an expansion bus minimum character score.

18. A translator as recited in claim 15, wherein said determining means comprises means for eliminating local minima having distance error signal values greater than said corresponding minimum normalized feature mask error.

19. A translator as recited in claim 15, wherein said determining means comprises a multipath feedforward network for simultaneously comparing said distance error signals for a corresponding feature mask compared with said pixels of said scan window.

20. A character translator, comprising:

a feature mask memory storing pixel data for a plurality of feature masks, said pixel data for each feature mask corresponding to a predetermined primitive element;

a plurality of fuzzifiers, each calculating a distance error signal of a scan region with respect to a center pixel representing a membership function center of a membership function region;

control means for selectively supplying said pixel data for each of said feature masks to said fuzzifiers in accordance with mask sequences stored in an external memory;

a scan buffer, responsive to pixel scan data of a scanned character within a scan window, for supplying said pixel scan data to said fuzzifiers, said fuzzifiers each outputting distance error signals with respect to the pixel scan data and said corresponding pixel data of said feature masks;

means for determining a minimum normalized feature mask error for each of said feature masks in response to said distance error signals;

means for calculating a normalized character score in response to said minimum normalized feature masks for each of said mask sequences, each of said normalized character scores representing a recognition error of a candidate character for said corresponding mask sequence.

21. A translator as recited in claim 20, further comprising means for determining a minimum normalized character score from said normalized character scores generated by said calculating means; and means for comparing said minimum normalized character score to a recognition threshold and outputting a character match signal in response thereto.

22. A translator as recited in claim 21, further comprising an expansion bus interface for outputting said minimum normalized character score onto an expansion bus, said expansion bus interface receiving from said expansion bus an expansion bus minimum character score.

23. A translator as recited in claim 20, wherein said determining means comprises means for eliminating local minima having distance error signal values greater than said corresponding minimum normalized feature mask error.

24. A translator as recited in claim 20, wherein said determining means comprises a multipath feedforward network for simultaneously comparing said distance error signals for a corresponding feature mask compared with said pixels of said scan window.

25. A character translator, comprising:

a feature mask memory configured for storing pixel data for a plurality of feature masks, said pixel data for each feature mask corresponding to a predetermined primitive element;

a fuzzy processor having a plurality of fuzzifiers, each fuzzifier calculating a distance error signal of a scan region with respect to a center pixel representing a membership function center of a membership function region, the fuzzy processor generating a normalized feature mask error signal for each said feature mask;

a controller configured for selectively supplying said pixel data for each of said feature masks to said fuzzifiers based on mask sequences stored in an external memory, wherein each mask sequence corresponds to a candidate character;

a scan controller, responsive to pixel scan data of a scanned character within a scan window, for supplying pixel scan data to said fuzzifiers in groups corresponding to the scan regions of said scan window, said fuzzifiers each outputting the distance error signals based on the pixel scan data and the corresponding pixel data of the corresponding feature masks; and a mask sequence comparator configured for determining a minimum normalized feature mask error for each of said feature masks based on the corresponding set so normalized feature mask error signals, the mask sequence comparator calculating a normalized character score based on the minimum normalized feature mask error signals of the respective feature masks for each of said mask sequences, each of said normalized character scores representing a recognition error of the corresponding candidate character for the corresponding mask sequence.

26. The translator of claim 25, wherein the mask sequence comparator comprises:

a minimum comparator for determining the minimum normalized feature mask error from the normalized feature mask error signals for the corresponding feature mask; and a normalizing circuit configured for calculating the normalized character score based on the normalized feature mask error signals for the corresponding mask sequence.

27. The translator of claim 26, wherein the mask sequence comparator further comprises a character sequence comparator for identifying an optimum character candidate based on a comparison of the normalized character scores.

* * * * *